United States Patent
Yoshikawa et al.

(10) Patent No.: US 9,819,872 B2
(45) Date of Patent: Nov. 14, 2017

(54) IMAGE PROCESSING APPARATUS AND IMAGE PROCESSING METHOD THAT ADJUST, BASED ON A TARGET OBJECT DISTANCE, AT LEAST ONE OF BRIGHTNESS OF EMITTED PATTERN LIGHT AND AN EXPOSURE AMOUNT

(71) Applicant: CANON KABUSHIKI KAISHA, Tokyo (JP)

(72) Inventors: Hiroshi Yoshikawa, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/519,270

(22) Filed: Oct. 21, 2014

(65) Prior Publication Data
US 2015/0116582 A1 Apr. 30, 2015

(30) Foreign Application Priority Data

Oct. 30, 2013 (JP) .................................. 2013-225819
Oct. 30, 2013 (JP) .................................. 2013-225821

(51) Int. Cl.
*H04N 5/235* (2006.01)
*G01B 21/04* (2006.01)
(Continued)

(52) U.S. Cl.
CPC ....... *H04N 5/2353* (2013.01); *G01B 11/0608* (2013.01); *G01B 11/25* (2013.01); *G01B 21/047* (2013.01)

(58) Field of Classification Search
CPC ................ H04N 5/2353; G01B 21/047; G01B 11/0608; G01B 11/25
See application file for complete search history.

(56) References Cited

U.S. PATENT DOCUMENTS

| 5,727,093 A | 3/1998 | Uchiyama et al. |
| 5,969,725 A | 10/1999 | Fujiki et al. |

(Continued)

FOREIGN PATENT DOCUMENTS

| CN | 103369252 A | 10/2013 |
| JP | 2000-241131 A | 9/2000 |

(Continued)

OTHER PUBLICATIONS

Communication including European Search Report dated Mar. 24, 2015, issued in corresponding European Patent Application No. 14003573.4-1558.

(Continued)

*Primary Examiner* — Mekonnen Dagnew
(74) *Attorney, Agent, or Firm* — Fitzpatrick, Cella, Harper & Scinto

(57) ABSTRACT

A processing apparatus includes an acquisition unit that acquires a captured image obtained by capturing, by an image capturing unit, a target object to which a projection unit has emitted pattern light. A derivation unit derives a distance from the image capturing unit to the target object by using the captured image. An adjustment unit adjusts, in accordance with the derived distance, at least one of a first parameter for controlling brightness of the pattern light emitted from the projection unit, and a second parameter for controlling an exposure amount of the image capturing unit.

17 Claims, 27 Drawing Sheets

(51) Int. Cl.
*G01B 11/06* (2006.01)
*G01B 11/25* (2006.01)

(56) References Cited

U.S. PATENT DOCUMENTS

| | | | |
|---|---|---|---|
| 6,151,028 | A | 11/2000 | Kumagai et al. |
| 6,400,362 | B1 | 6/2002 | Uchiyama et al. |
| 6,876,392 | B1 | 4/2005 | Uomori et al. |
| 7,570,370 | B2 | 8/2009 | Steinbichler et al. |
| 7,613,356 | B2 | 11/2009 | Uchiyama et al. |
| 9,332,244 | B2 | 5/2016 | Tsuyuki |
| 9,589,339 | B2 | 3/2017 | Abe |
| 2008/0130016 | A1 | 6/2008 | Steinbichler et al. |
| 2008/0267450 | A1* | 10/2008 | Sugimoto ............ A63H 17/395 382/103 |
| 2010/0079581 | A1* | 4/2010 | Russell ............... H04N 13/0253 348/46 |
| 2012/0075878 | A1* | 3/2012 | Sato .......................... B60R 1/00 362/538 |
| 2012/0133954 | A1 | 5/2012 | Takabayashi et al. |
| 2013/0141544 | A1 | 6/2013 | Tsuyuki |
| 2014/0071243 | A1* | 3/2014 | Nakatsukasa .......... G01B 11/24 348/46 |
| 2014/0118539 | A1 | 5/2014 | Ota et al. |
| 2016/0205376 | A1 | 7/2016 | Tsuyuki |

FOREIGN PATENT DOCUMENTS

| | | |
|---|---|---|
| JP | 2000-292133 A | 10/2000 |
| JP | 2008-032608 A | 2/2008 |
| JP | 2009-168658 A | 7/2009 |
| JP | 2009-250844 A | 10/2009 |
| JP | 2011-047931 A | 3/2011 |
| JP | 2012-068176 A | 4/2012 |
| JP | 2012-141252 A | 7/2012 |
| JP | 2013-120092 A | 6/2013 |

OTHER PUBLICATIONS

Chinese Official Action dated May 25, 2017, issued in corresponding Chinese Patent Application No. 201410601537.3, with an English translation.

Japanese Official Action dated Sep. 11, 2017, issued in corresponding Japanese Patent Application No. 2013-225819.

* cited by examiner

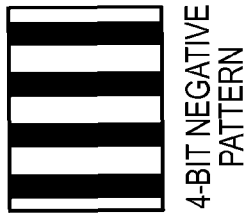

CASE IN WHICH EXPOSURE TIME IS N

CASE IN WHICH EXPOSURE TIME IS 2N

CASE IN WHICH EXPOSURE TIME IS 1.5N

F I G. 10
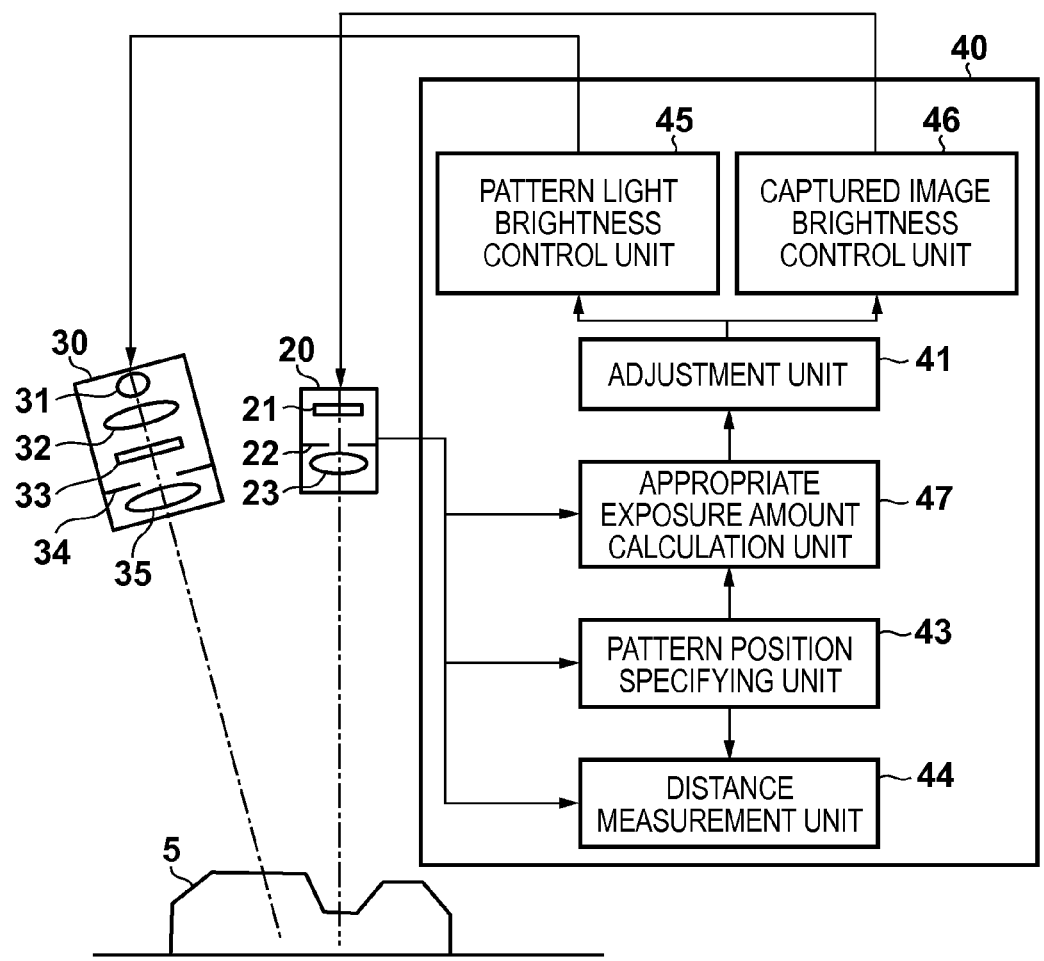

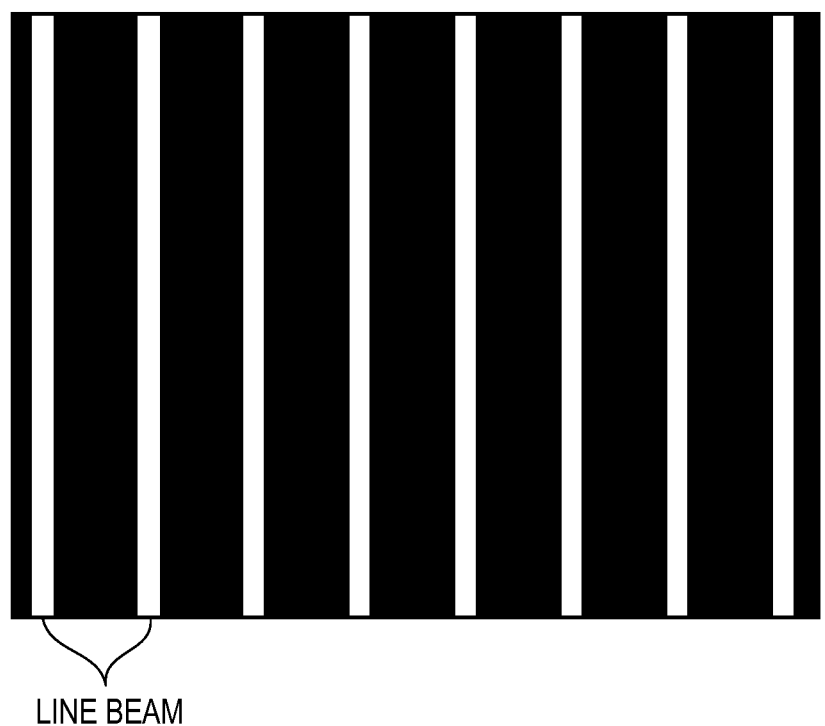
F I G. 14

F I G. 16
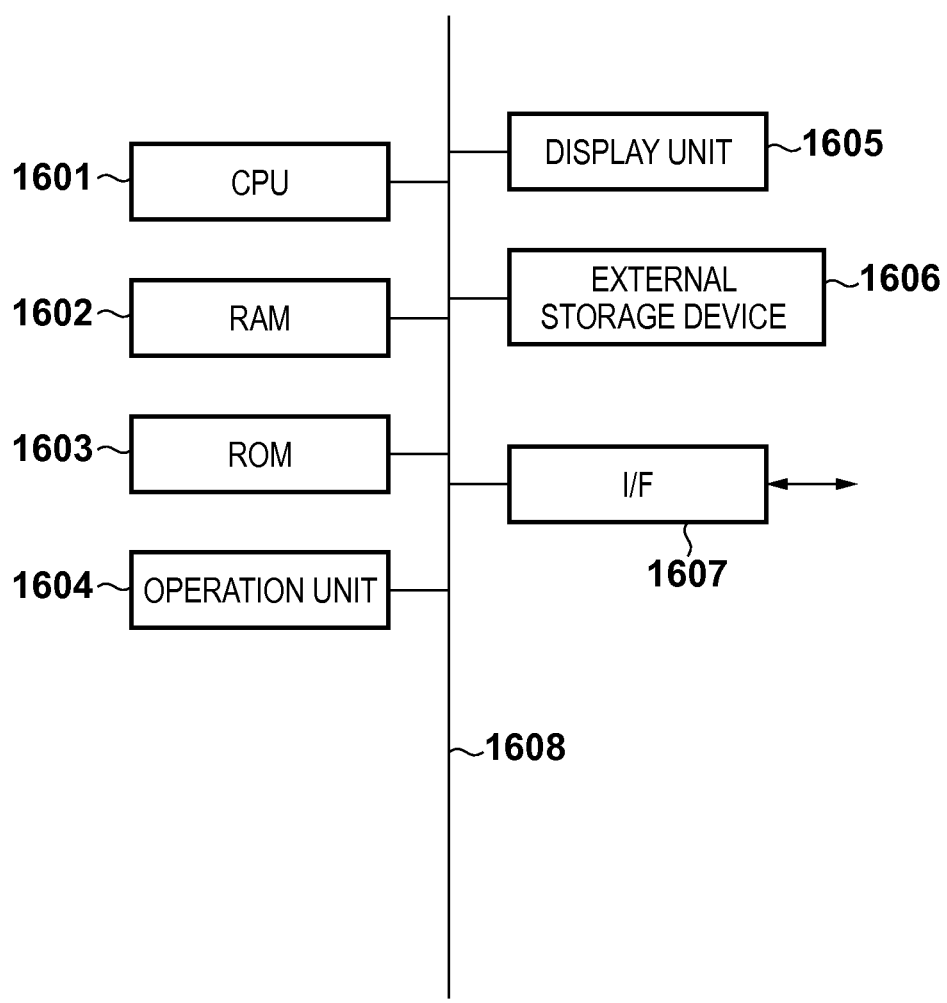

CASE IN WHICH TARGET OBJECT EXISTS
AT SHORT DISTANCE Zn

CASE IN WHICH TARGET OBJECT EXISTS
AT MIDDLE DISTANCE Zm

CASE IN WHICH TARGET OBJECT EXISTS
AT LONG DISTANCE Zf

CASE IN WHICH TARGET OBJECT EXISTS AT SHORT DISTANCE Zn

CASE IN WHICH TARGET OBJECT EXISTS AT MIDDLE DISTANCE Zm

CASE IN WHICH TARGET OBJECT EXISTS AT LONG DISTANCE Zf

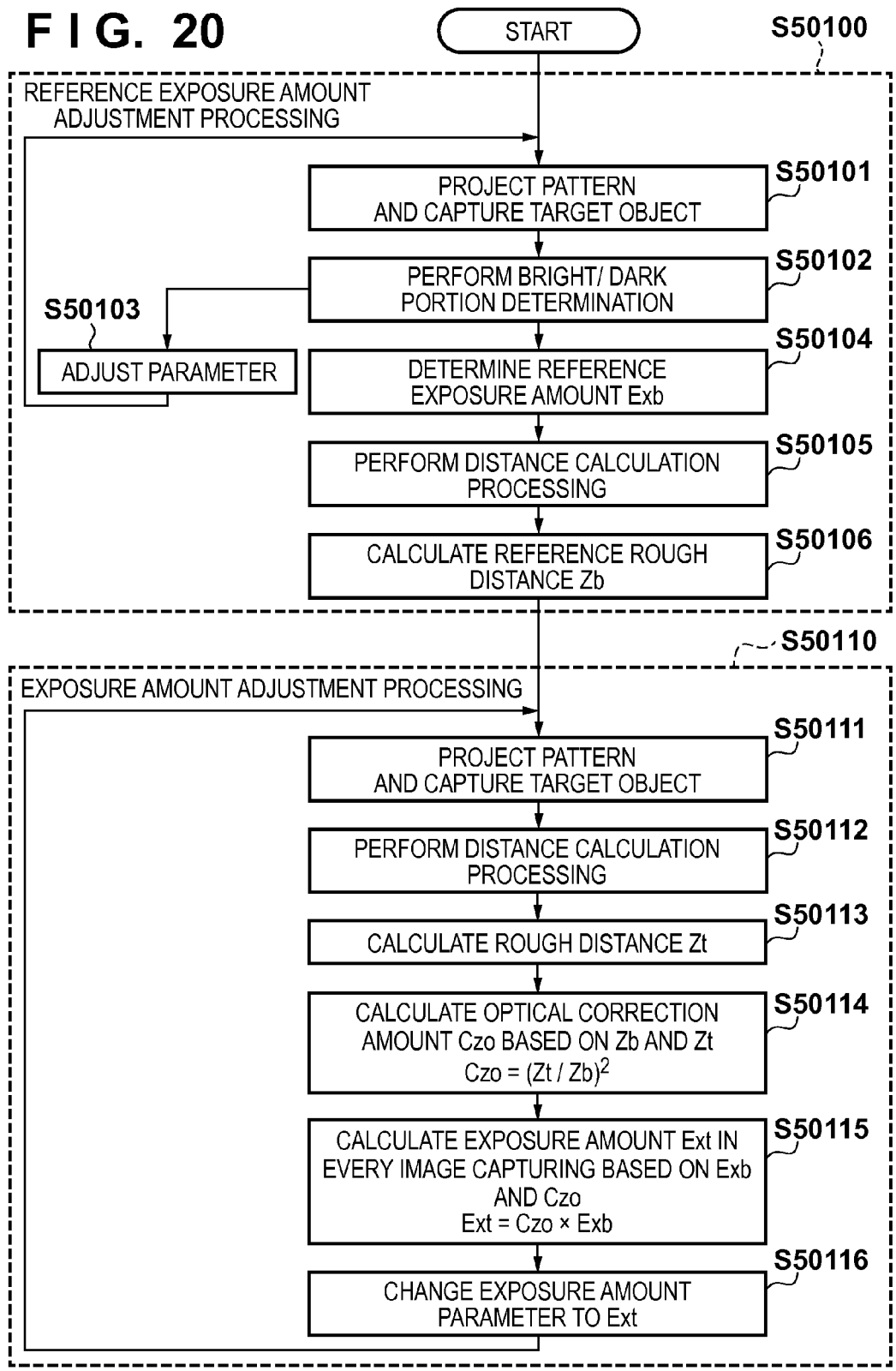

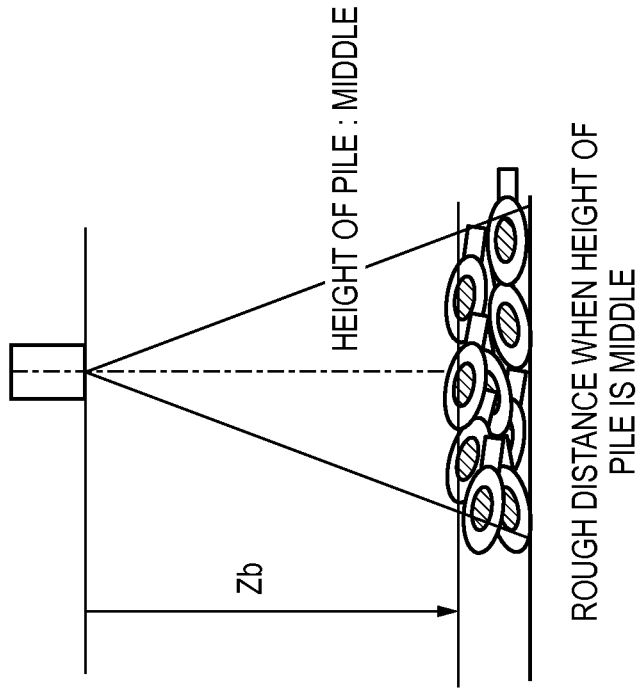
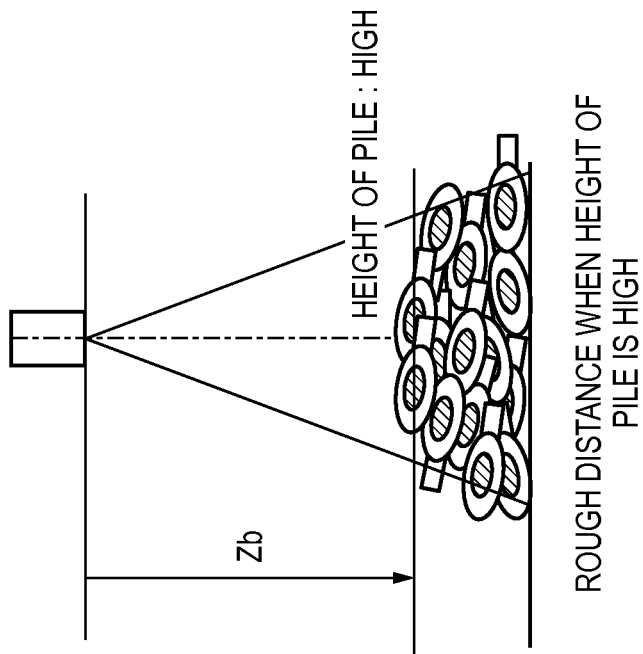

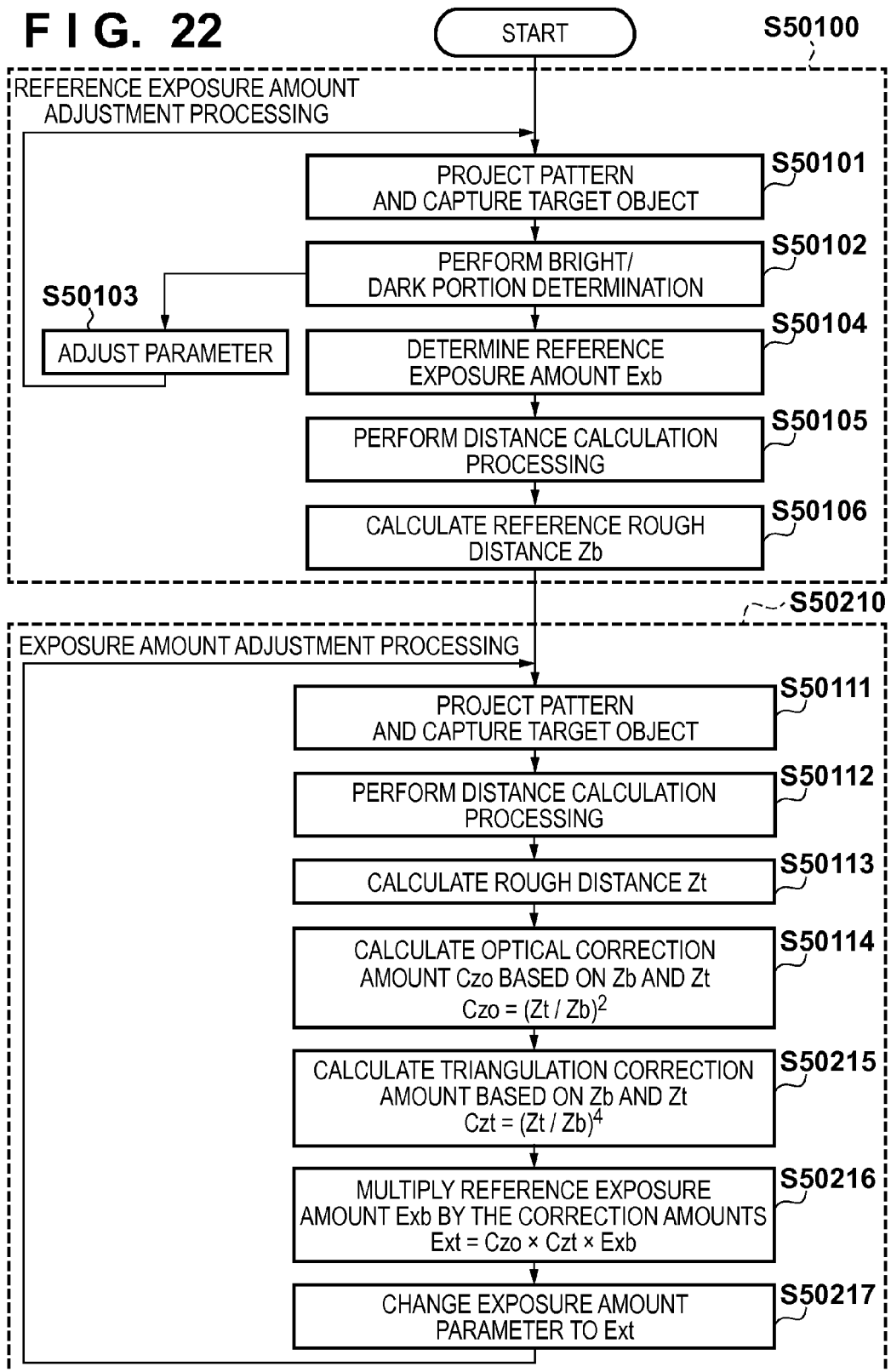

IMAGE PROCESSING APPARATUS AND IMAGE PROCESSING METHOD THAT ADJUST, BASED ON A TARGET OBJECT DISTANCE, AT LEAST ONE OF BRIGHTNESS OF EMITTED PATTERN LIGHT AND AN EXPOSURE AMOUNT

CLAIM OF PRIORITY

This application claims the benefit of Japanese Patent Application No. 2013-225819, filed Oct. 30, 2013, and No. 2013-225821, filed Oct. 30, 2013, which are hereby incorporated by reference herein in their entirety.

BACKGROUND OF THE INVENTION

Field of the Invention

The present invention relates to a technique for performing distance measurement with respect to a target object.

Description of the Related Art

There is known a method of projecting pattern light to a target object using a projection unit such as a projector, and specifying the position of the pattern light from a captured image obtained by capturing the target object by an image capturing unit such as a camera, thereby measuring a distance.

The reflectance of the surface of a target object and the orientation in which the target object is placed vary. Thus, the image luminance gradation value of pattern light projected from the projection unit in a captured image changes variously. To specify the position of pattern light under various conditions, brightness adjustment of pattern light and exposure amount adjustment of the image capturing unit need to be performed appropriately. If these adjustments are improper, pattern light in a captured image is saturated or causes shadow detail loss, and the position of the pattern light cannot be specified. Also, if these adjustments are insufficient, the position of pattern light may be specified, but the position specifying accuracy drops.

In Japanese Patent Laid-Open No. 2012-68176, the maximum reflectance is determined based on the image luminance gradation value of an image captured after projecting uniform pattern light in advance, and the brightness of pattern light and the exposure amount of the image capturing unit are determined based on the reflectance.

In Japanese Patent Laid-Open No. 2009-250844, the exposure amount of an image capturing unit is adjusted using the histogram of the image luminance gradation value of an image captured after projecting an optical cutting line. More specifically, in the image luminance gradation value histogram, the difference between the first peak, corresponding to an optical cutting line portion, and the second peak, corresponding to background light generated by illumination light in a measurement environment, is adjusted to be equal to or greater than a threshold. Further, the first peak is adjusted not to exceed a preset upper limit value.

In the method disclosed in Japanese Patent Laid-Open No. 2012-68176, the brightness of pattern light and the exposure amount of the image capturing unit are determined based on the image luminance gradation value of, not pattern light used to specify a position, but uniform pattern light. Thus, the influence of a decrease in the contrast of pattern light arising from, for example, a blur in the projection optical system or an image capturing optical system that is generated in pattern light used to specify a position is not taken into account. As a result, adjustment in the pattern light becomes insufficient, and the pattern position specifying accuracy may drop. Also, the maximum reflectance and exposure amount are determined based on the maximum value of the image luminance gradation value. When the target object is highly glossy, no appropriate adjustment may be performed throughout the entire frame under the influence of partially generated halation.

The invention disclosed in Japanese Patent Laid-Open No. 2009-250844 effectively functions in a case in which the peak of the image luminance gradation value histogram by projection light and the peak of background light are clearly separated. In a case in which the luminance of background light is high and is almost equal to the luminance of projection light, however, it is difficult to discriminate the peaks of the image luminance gradation value histograms of projection light and background light, and the invention may not effectively function.

There is known a recognition processing apparatus that estimates the positions and orientations of a plurality of piled target objects based on distance measurement results by a distance measurement apparatus configured to perform the above-described distance measurement. A system can be constructed, in which the robot can automatically pick piled target objects by outputting, to a robot control apparatus, the estimation results of the positions and orientations of target objects by the recognition processing apparatus.

Assuming a scene in which many target objects are piled, the distance from the apparatus to a target object changes depending on the height of the pile. If the distance from the apparatus to a target object changes, the illuminance of projection pattern light and the brightness of a captured image change. More specifically, the brightness of a captured image decreases in proportion to the square of the distance from the apparatus to a target object.

Further, light falloff at edges occurs in accordance with the position of a target object in a captured image and the position of the target object in the projection range, and the brightness of the captured image changes. That is, the captured image becomes brighter toward the center of the frame, and darker toward the edge. For example, the captured image becomes dark based on the cosine fourth-power law.

In this manner, the image luminance gradation value of pattern light projected from the projection unit in a captured image changes variously in accordance with the distance to a target object or the position in the captured image. If the captured image becomes dark, the influence of noise of an image capturing element increases, and the distance measurement accuracy decreases. The decrease in distance measurement accuracy decreases even the estimation accuracy of the position and orientation of a target object by the recognition processing apparatus. The picking system may cause a failure such as a failure in picking a target object by the robot.

To perform distance measurement at high accuracy regardless of the distance or the position in the captured image, brightness adjustment of pattern light and exposure amount adjustment of the image capturing unit need to be performed appropriately in accordance with the distance or the position in the frame. If these adjustments are improper, pattern light in a captured image is saturated or causes shadow detail loss, and distance measurement becomes impossible. If these adjustments are insufficient, distance measurement may be possible, but the measurement accuracy drops.

Japanese Patent Laid-Open No. 2000-292133 has disclosed a method of arranging an element in which the transmittance is low at the center and increases toward the edge so as to cancel the influence of light falloff at edges. Japanese Patent Laid-Open No. 2000-241131 has disclosed a range finder apparatus that controls an optical output from a light source based on the measurement result of a rough distance.

In the method disclosed in Japanese Patent Laid-Open No. 2000-292133, the illuminance of the illumination becomes constant for target objects placed at the same distance, and a decrease in accuracy by light falloff at edges can be suppressed. To the contrary, the illuminance does not become constant for target objects at different depths. For this reason, the method disclosed in Japanese Patent Laid Open No. 2000-292133 decreases the accuracy.

In the method disclosed in Japanese Patent Laid-Open No. 2000-241131, the exposure amount of the entire frame is adjusted based on a rough distance. However, optimal exposure amount adjustment is not implemented for a target object placed at a specific position in the projection area.

SUMMARY OF THE INVENTION

The present invention has been made to solve the above-described problems, and provides a technique for reliably specifying the position of pattern light at high accuracy.

The present invention also provides a technique for performing distance measurement with respect to each target object at higher accuracy.

According to a first aspect, the present invention provides an image processing apparatus comprising an acquisition unit configured to acquire a captured image obtained by capturing, by an image capturing unit, a target object to which a pattern has been projected, and an adjustment unit configured to adjust, based on the pattern in the acquired captured image, at least one of a first parameter for controlling brightness of the pattern projected from a projection unit configured to project the pattern, and a second parameter for controlling an exposure amount of the image capturing unit.

According to a second aspect, the present invention provides an image processing apparatus comprising an acquisition unit configured to acquire a captured image obtained by capturing, by an image capturing unit, a target object to which a pattern has been projected, a unit configured to specify a maximum pixel value among pixel values of respective pixels referred to detect a position of the pattern from the captured image, and acquire a distribution of the maximum pixel value, and an adjustment unit configured to adjust, by using the distribution, a first parameter for controlling brightness of the pattern projected from a projection unit configured to project the pattern, or a second parameter for controlling an exposure amount of the image capturing unit.

According to a third aspect, the present invention provides an image processing method to be performed by an image processing apparatus, comprising an acquisition step of acquiring a captured image obtained by capturing, by an image capturing unit, a target object to which a pattern has been projected, and an adjustment step of adjusting, based on the pattern in the acquired captured image, at least one of a first parameter for controlling brightness of the pattern projected from a projection unit configured to project the pattern, and a second parameter for controlling an exposure amount of the image capturing unit.

According to a fourth aspect, the present invention provides an image processing method to be performed by an image processing apparatus, comprising an acquisition step of acquiring a captured image obtained by capturing, by an image capturing unit, a target object to which a pattern has been projected, a step of specifying a maximum pixel value among pixel values of respective pixels referred to detect a position of the pattern from the captured image, and acquiring a distribution of the maximum pixel value, and an adjustment step of adjusting, by using the distribution, a first parameter for controlling brightness of the pattern projected from a projection unit configured to project the pattern, or a second parameter for controlling an exposure amount of the image capturing unit.

According to a fifth aspect, the present invention provides a computer-readable storage medium storing a computer program for causing a computer to function as an acquisition unit configured to acquire a captured image obtained by capturing, by an image capturing unit, a target object to which a pattern has been projected, and an adjustment unit configured to adjust, based on the pattern in the acquired captured image, at least one of a first parameter for controlling brightness of the pattern projected from a projection unit configured to project the pattern, and a second parameter for controlling an exposure amount of the image capturing unit.

According to a sixth aspect, the present invention provides an image processing apparatus comprising an acquisition unit configured to acquire a captured image obtained by capturing, by an image capturing unit, a target object to which a projection unit has projected a pattern, a derivation unit configured to derive a distance from the image capturing unit to the target object by using the captured image, and an adjustment unit configured to adjust, in accordance with the derived distance, at least one of a first parameter for controlling brightness of the pattern projected from the projection unit, and a second parameter for controlling an exposure amount of the image capturing unit.

According to a seventh aspect, the present invention provides an image processing method to be performed by an image processing apparatus, comprising an acquisition step of acquiring a captured image obtained by capturing, by an image capturing unit, a target object to which a projection unit has projected a pattern, a derivation step of deriving a distance from the image capturing unit to the target object by using the captured image, and an adjustment step of adjusting, in accordance with the derived distance, at least one of a first parameter for controlling brightness of the pattern projected from the projection unit, and a second parameter for controlling an exposure amount of the image capturing unit.

According to an eighth aspect, the present invention provides a computer-readable storage medium storing a computer program for causing a computer to function as an acquisition unit configured to acquire a captured image obtained by capturing, by an image capturing unit, a target object to which a projection unit has projected a pattern, a derivation unit configured to derive a distance from the image capturing unit to the target object by using the captured image, and an adjustment unit configured to adjust, in accordance with the derived distance, at least one of a first parameter for controlling brightness of the pattern projected from the projection unit, and a second parameter for controlling an exposure amount of the image capturing unit.

Further features of the present invention will become apparent from the following description of exemplary embodiments with reference to the attached drawings.

BRIEF DESCRIPTION OF THE DRAWINGS

FIGS. 2A to 2G are views each showing an example of projection light;

FIG. 10 is a block diagram showing an example of the functional arrangement of an image processing apparatus;

FIG. 14 is a view showing an example of pattern light used in a modification;

FIG. 16 is a block diagram showing an example of the hardware arrangement of an apparatus applicable to the image processing unit 40;

FIG. 20 is a flowchart showing processing to be performed by an image processing unit 5040;

FIGS. 21A and 21B are views for explaining processing in step S50106;

FIG. 22 is a flowchart showing processing to be performed by the image processing unit 5040;

DESCRIPTION OF THE EMBODIMENTS

Embodiments of the present invention will now be described with reference to the accompanying drawings. Note that the embodiments to be described below are examples of a detailed implementation of the present invention, and are detailed examples of the arrangement described in the appended claims.

First Embodiment

Figure 1:
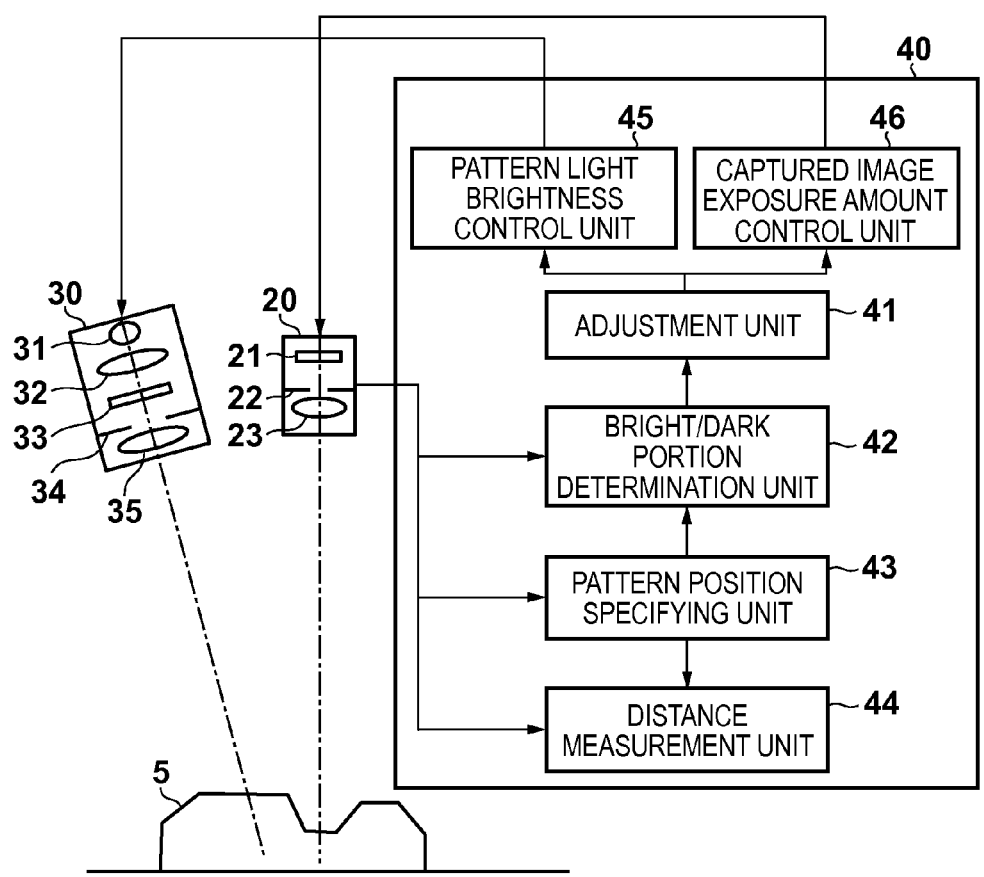
FIG. 1 is a block diagram showing an example of the functional arrangement of an image processing apparatus.

First, an example of the functional arrangement of an image processing apparatus (distance measurement apparatus) according to the first embodiment will be described with reference to the block diagram of FIG. 1. As shown in FIG. 1, the image processing apparatus includes a projection unit 30 that projects pattern light to a target object 5, an image capturing unit 20 that captures the target object 5 to which the pattern light has been projected, and an image processing unit 40 that controls the projection unit 30 and image capturing unit 20, and performs distance measurement with respect to the target object 5 based on a space encoding method.

First, the projection unit 30 will be explained. As shown in FIG. 1, the projection unit 30 includes a light source 31, an illumination optical system 32, a display element 33, a projection stop 34, and a projection optical system 35.

The light source 31 is, for example, one of various light emitting elements such as a halogen lamp and an LED. The illumination optical system 32 is an optical system having a function of guiding light emitted by the light source 31 to the display element 33. For example, an optical system suited to make uniform the luminance, such as Koehler illumination or a diffusion plate, is used. The display element 33 is an element having a function of spatially controlling the transmittance or reflectance of light traveling from the illumination optical system 32 in accordance with a supplied pattern. For example, a transmission LCD, reflection LCOS, or DMD is used. As for supply of a pattern to the display element 33, a plurality of types of patterns held in the projection unit 30 may be sequentially supplied to the display element 33. Alternatively, a plurality of types of patterns held in an external apparatus (for example, the image processing unit 40) may be sequentially acquired and supplied to the display element 33. The projection optical system 35 is an optical system configured to form light (pattern light) guided from the display element 33 into an image at a specific position of the target object 5. The projection stop 34 is used to control the F-number of the projection optical system 35.

Next, the image capturing unit 20 will be explained. As shown in FIG. 1, the image capturing unit 20 includes an image capturing optical system 23, an image capturing stop 22, and an image capturing element 21.

The image capturing optical system 23 is an optical system configured to image a specific position of the target object 5 on the image capturing element 21. The image capturing stop 22 is used to control the F-number of the image capturing optical system 23. The image capturing element 21 is, for example, one of various photoelectric conversion elements, such as a CMOS sensor and a CCD sensor. Note that an analog signal photoelectrically converted by the image capturing element 21 is sampled and quantized by a control unit (not shown) in the image capturing unit 20, and is converted into a digital image signal. Further, the control unit generates, from the digital image signal, an image (captured image) in which each pixel has a luminance gradation value (density value and pixel value). The control unit appropriately sends the captured image to a memory in the image capturing unit 20 or to the image processing unit 40.

Note that the image capturing unit 20 captures the target object 5 every time the projection unit 30 projects different pattern light. More specifically, the image capturing unit 20 and projection unit 30 operate synchronously, and the image capturing unit 20 can capture the image of the target object 5 to which each different pattern light has been projected.

Next, the image processing unit 40 will be explained. As shown in FIG. 1, the image processing unit 40 includes an adjustment unit 41, a bright/dark portion determination unit 42, a pattern position specifying unit 43, a distance measurement unit 44, a pattern light brightness control unit 45, and a captured image exposure amount control unit 46.

The pattern position specifying unit 43 acquires an image captured by the image capturing unit 20, and specifies, from the acquired captured image, the position (pattern position) of pattern light in the captured image.

The bright/dark portion determination unit 42 acquires an image captured by the image capturing unit 20, and performs bright/dark portion determination by using the luminance gradation value of each pixel constituting the acquired captured image, and a pattern position specified from the captured image by the pattern position specifying unit 43.

In accordance with the result of determination by the bright/dark portion determination unit 42, the adjustment unit 41 determines parameters for controlling the bright/dark portion of an image to be captured next time by the image capturing unit 20. The "parameters for controlling the bright/dark portion of an image to be captured next time by the image capturing unit 20" include a parameter for the image capturing unit 20, and a parameter for the projection unit 30. Both or either of the parameters may be determined.

When the adjustment unit 41 determines the "parameter for the projection unit 30", the pattern light brightness control unit 45 controls the brightness of pattern light projected from the projection unit 30 in accordance with the parameter. The method of controlling the brightness of pattern light includes, for example, the following three methods.

The first method is to control the emission luminance of the light source 31. In the case of a halogen lamp, when the application voltage is increased, the emission luminance increases. In the case of an LED, when a current to be supplied is increased, the emission luminance increases. In this case, the "parameter for the projection unit 30" is a parameter for controlling the emission luminance of the light source 31.

The second method is to control the display gradation value of the display element 33. In the case of an LCD, when the display gradation value is increased, the transmittance increases, and pattern light becomes bright. In the case of an LCOS, when the display gradation value is increased, the reflectance increases, and pattern light becomes bright. In the case of a DMD, when the display gradation value is increased, the ON count per frame increases, and pattern light becomes bright. In this case, the "parameter for the projection unit 30" is a parameter for controlling the display gradation value of the display element 33.

The third method is to control the projection stop 34. When the stop is opened, pattern light becomes bright. To the contrary, when the stop is narrowed, pattern light becomes dark. When controlling the projection stop 34, the depth of field of the projection optical system also changes, so this influence needs to be considered. In this case, the "parameter for the projection unit 30" is a parameter for controlling the projection stop 34.

When the adjustment unit 41 determines the "parameter for the image capturing unit 20", the captured image exposure amount control unit 46 controls, in accordance with the parameter, an exposure amount at the time of image capturing by the image capturing unit 20, thereby controlling the luminance gradation value of a captured image. The method of controlling the exposure amount of the image capturing unit 20 includes, for example, the following two methods.

The first method is to control the exposure time (shutter speed) of the image capturing element 21. When the exposure time is prolonged, the luminance gradation value of a captured image increases. In contrast, when the exposure time is shortened, the luminance gradation value decreases. In this case, the "parameter for the image capturing unit 20" is a parameter for controlling the exposure time (shutter speed) of the image capturing element 21.

The second method is to control the image capturing stop 22. When the stop is opened, the luminance gradation value of a captured image increases. Conversely, when the stop is narrowed, the luminance gradation value of a captured image decreases. When controlling the image capturing stop 22, the depth of field of the image capturing optical system also changes, so this influence needs to be considered. In this case, the "parameter for the image capturing unit 20" is a parameter for controlling the image capturing stop 22.

The distance measurement unit 44 acquires an image captured by the image capturing unit 20 every time the projection unit 30 projects each of a plurality of types of pattern beams. Then, the distance measurement unit 44 measures a distance from the image capturing unit 20 (image capturing optical system 23) to the target object 5 by the triangulation principle using a space code decoded from the acquired captured image, and a pattern position specified by the pattern position specifying unit 43 for the acquired captured image.

Although distance measurement is performed based on the space encoding method in the embodiment, as described above, there are a plurality of derivative forms for the space encoding method. The embodiment adopts a method disclosed in Japanese Patent Laid-Open No. 2011-47931. The principle of this method will be explained briefly.

FIGS. 2A to 2G show projection patterns (pattern beams) in a four-bit space encoding method. A projection pattern (full light-on pattern) shown in FIG. 2A, and a projection pattern (full light-off pattern) shown in FIG. 2B are used to detect a shadow region and to determine a bright/dark portion determination threshold. Projection patterns (positive patterns of one bit to four bits, respectively) in FIGS. 2C to 2F are used to determine a space code. A projection pattern (four-bit negative pattern) in FIG. 2G is used to specify a pattern position at high accuracy together with the four-bit positive pattern.

Figure 3:
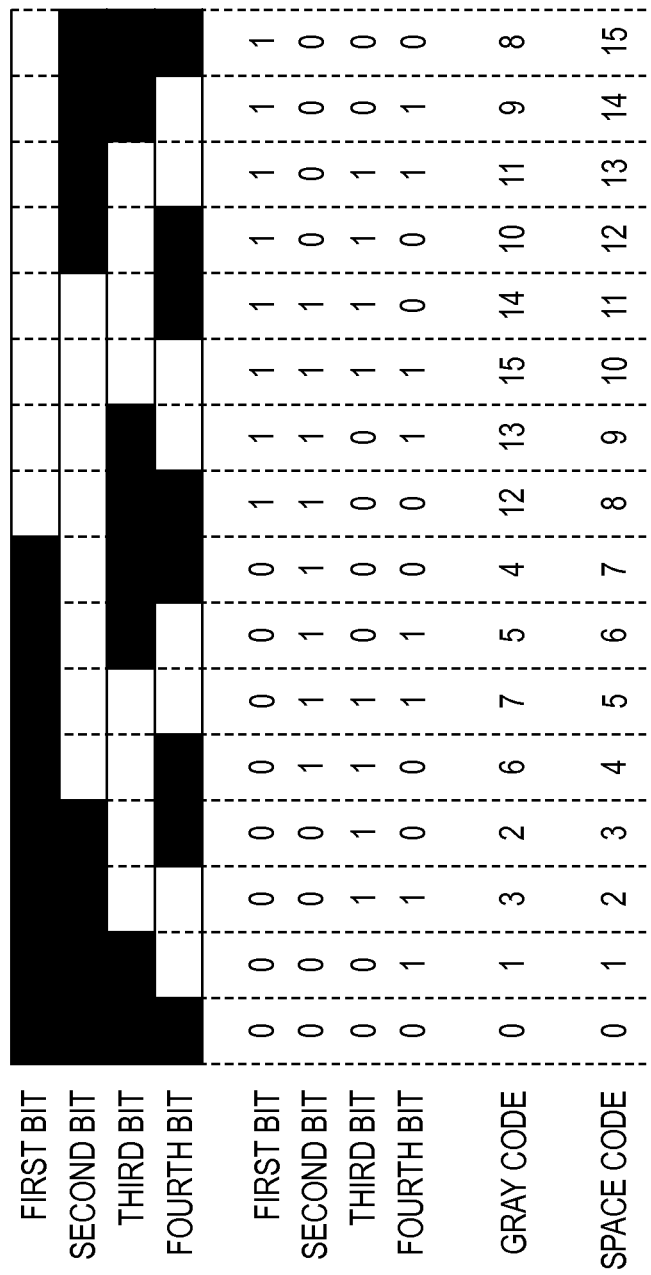
FIG. 3 is a view showing a four-bit gray code.

For four bits, the number of the space code is sixteen. Letting N be the number of bits of a projection pattern, the number of the space code becomes 2N. In the projection patterns of one bit to four bits shown in FIGS. 2A to 2G, the layout of bright and dark (white and black) portions of a pattern is determined based on a sign called a gray code. FIG. 3 shows a four-bit gray code. The gray code is a pattern in which the Hamming distance between adjacent codes becomes 1. Even if the code determination is erroneous, the error can be minimized. Thus, the gray code is often used as a projection pattern in the space encoding method.

Next, a method of decoding a space code from a captured image will be explained. The projection patterns of one bit to four bits shown in FIGS. 2A to 2G are projected to a measurement target object, and the images of the measurement target object to which the respective projection patterns have been projected are captured. Based on the luminance gradation value of each pixel in each captured image obtained by the image capturing, it is determined whether the pixel is a portion irradiated with the bright portion of the projection pattern or a portion irradiated with the dark portion. The determination criterion for this determination can use the average value of the luminance gradation values of the full light-on pattern and full light-off pattern. More specifically, for each pixel in the captured image, if the luminance gradation value of the pixel is equal to or greater than the average value, it is determined that the pixel is the bright portion; if the luminance gradation value of the pixel is lower than the average value, it is determined that the pixel is the dark portion. A bit value "1" is assigned to a pixel determined to be the bright portion, and a bit value "0" is assigned to a pixel determined to be the dark portion. This processing is performed for each of the captured images of the projection patterns of one bit to four bits, giving a bit value of four bits (gray code of four bits) to each pixel in the captured image. By converting the four-bit gray code into a space code, the exit direction from the projection unit can be uniquely specified. For example, when a code "0110" is assigned to a given pixel, as shown in FIG. 3, the gray code is six. This gray code is converted into a space code of four.

Figure 4:
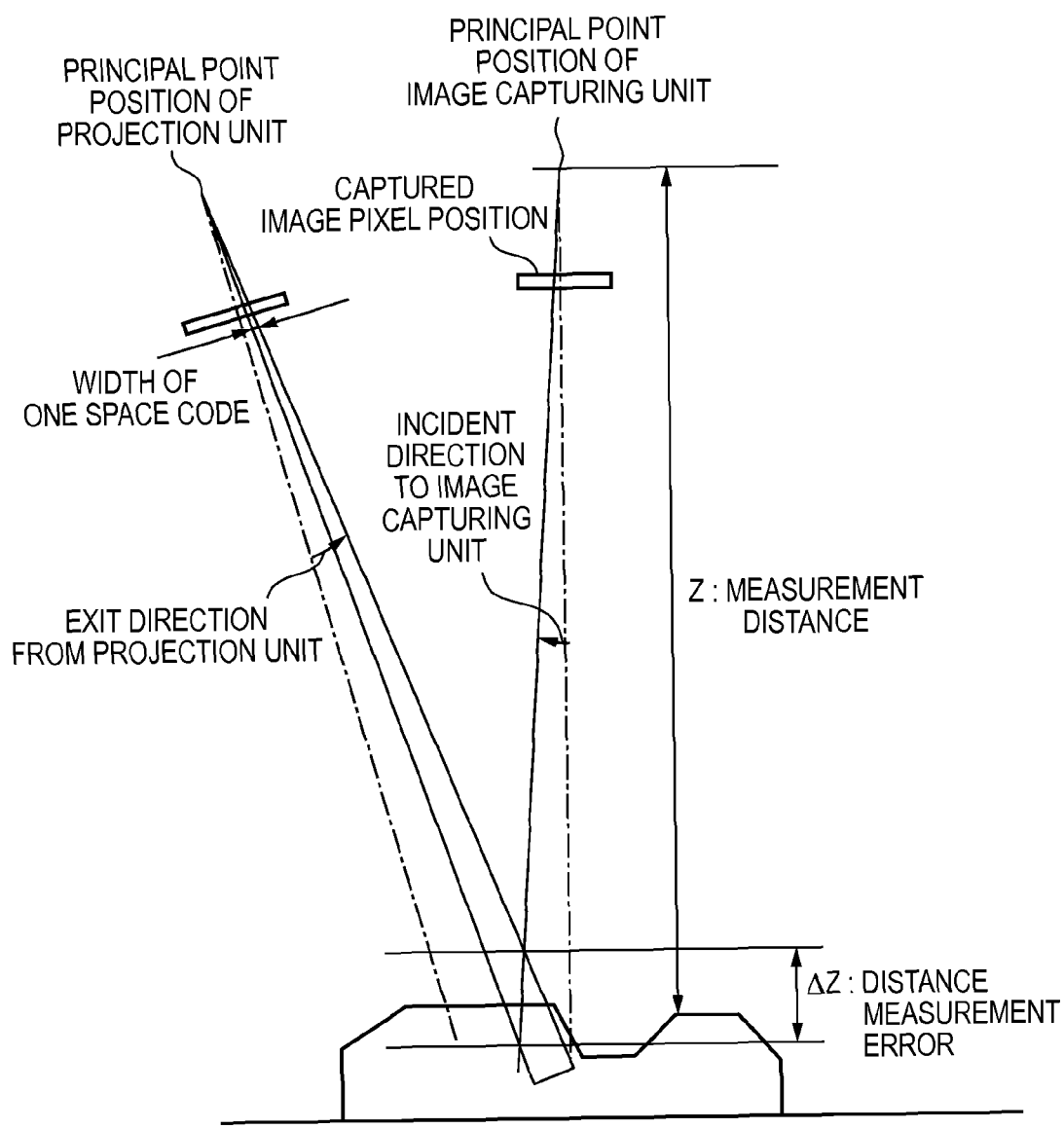
FIG. 4 is a schematic view showing the relationship among an image capturing unit 20, a projection unit 30, and a target object 5.

As shown in FIG. 4, the incident direction of light to the image capturing unit (more specifically, the principal point position of the image capturing unit) is determined from a pixel position in a captured image. When the space code of the pixel position is determined, the exit direction from the projection unit is specified. After the two directions are determined, distance measurement with respect to a measurement target object becomes possible based on the triangulation principle. This is the distance measurement principle based on the space encoding method.

The space encoding method can reduce an error by also using pattern light obtained by inverting the bright and dark portions of the projection pattern (in FIGS. 2A to 2G, the four-bit negative pattern in FIG. 2G). The error reduction method will be explained subsequently with reference to FIG. 4.

Since the exit direction from the projection unit has a spread corresponding to the width of one space code, a distance measurement error is generated by ΔZ. To reduce the error, a negative pattern (in FIGS. 2A to 2G, the four-bit negative pattern in FIG. 2G) obtained by inverting the bright and dark portions of the projection pattern (in FIGS. 2A to 2G, the four-bit positive pattern in FIG. 2F) of the least significant bit (in FIGS. 2A to 2G, the fourth bit) is further projected. An intersection point position between a luminance value waveform formed from the luminance values of respective pixels constituting the captured image of a target object to which the positive pattern has been projected, and a luminance value waveform formed from the luminance values of respective pixels constituting the captured image of the target object to which the negative pattern has been projected is set as a pattern position. This pattern position is used for the distance measurement. The intersection point position is a boundary position between adjacent space codes, and ideally, does not have a width. In practice, the width is not zero, because quantization and sampling are executed when receiving a captured image as a digital image signal, and the luminance gradation value of the captured image contains image capturing element noise. The distance measurement error, however, can be greatly reduced. The pattern position specifying unit 43 executes the processing of specifying the intersection point position. The method of reducing the distance measurement error has been explained.

Figure 5A:
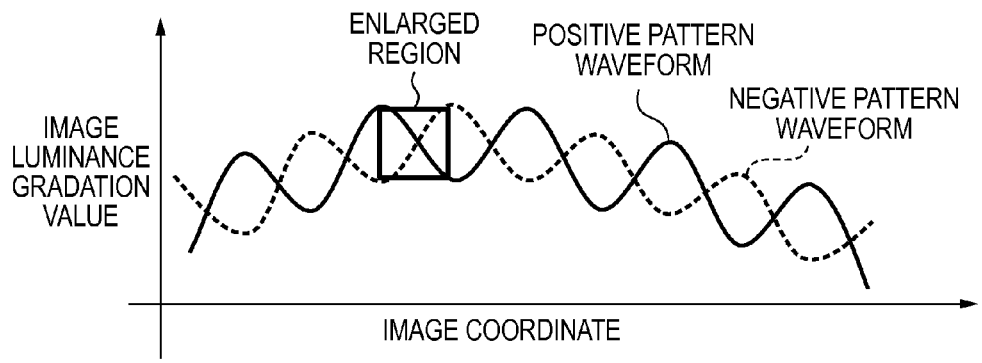
FIGS. 5A and 5B are graphs for explaining the pattern position specifying accuracy.
Figure 5B:
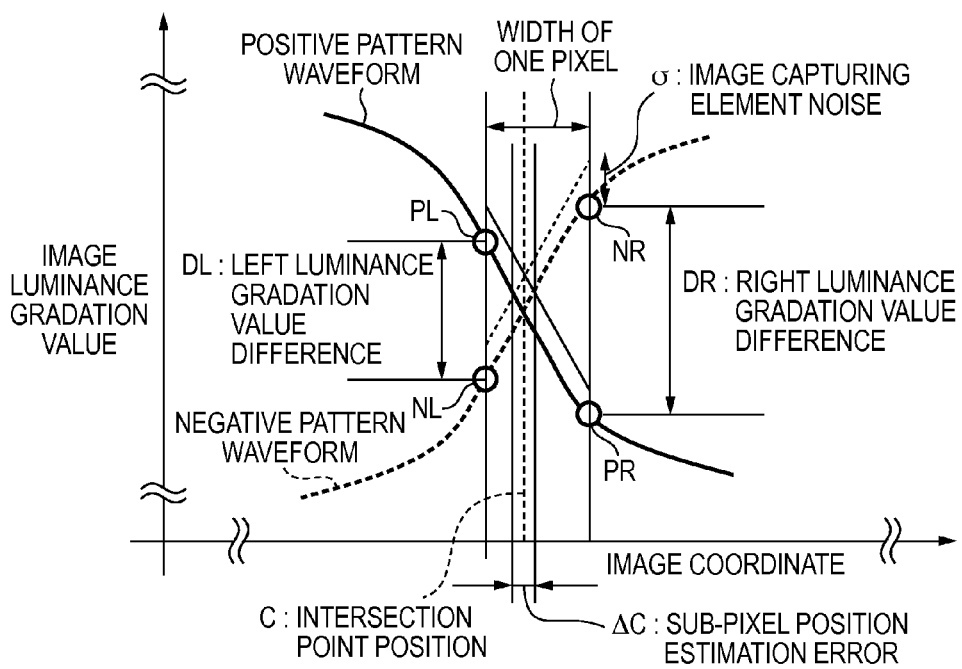

Next, the pattern position specifying accuracy will be explained with reference to FIGS. 5A and 5B. FIG. 5A is a graph in which the abscissa represents the image coordinate, and the ordinate represents the luminance gradation value. The image coordinate along the abscissa is a coordinate in a direction perpendicular to the direction of the stripe of a projection pattern in a captured image. A solid line indicates a luminance value waveform (positive pattern waveform) formed from the luminance values of respective pixels on one line in the direction perpendicular to the direction of the stripe of the positive pattern. A dotted line indicates a luminance value waveform (negative pattern waveform) formed from the luminance values of respective pixels on one line in the direction perpendicular to the direction of the stripe of the negative pattern. Note that the respective waveforms are luminance value waveforms formed from the luminance values of respective pixels on the line at the same position in each captured image. FIG. 5B is an enlarged view showing the respective waveforms in a region surrounded by a thick solid line.

In FIG. 5B, attention is paid to four points (all on the positive pattern waveform or negative pattern waveform) near the intersection point between the positive pattern waveform and the negative pattern waveform. PL is a luminance gradation value at a point on the positive pattern waveform out of two points (their image coordinates (values along the abscissa) are the same) on the left side from the intersection point position, and NL is a luminance gradation value at a point on the negative pattern waveform. Also, PR is a luminance gradation value at a point on the positive pattern waveform out of two points (their image coordinates (values along the abscissa) are the same) on the right side from the intersection point position, and NR is a luminance gradation value at a point on the negative pattern waveform. DL is the absolute value of the difference (PL−NL) between the luminance gradation values, and DR is the absolute value of the difference (PR−NR) between the luminance gradation values.

Luminance waveforms near the intersection point are linearly approximated (a luminance waveform between the point of the luminance gradation value PL and the point of the luminance gradation value PR, and a luminance waveform between the point of the luminance gradation value NL and the point of the luminance gradation value NR are approximated by straight lines, respectively). Then, an intersection point position C (image coordinate) between the respective straight lines is given by:

$$C = L + DL/(DL+DR) \quad (1)$$

where L is the image coordinate (value along the abscissa) of the point of the luminance gradation value PL (point of the luminance gradation value NL). For descriptive convenience, the intersection point position C will be explained as a relative position using, as a reference, the image coordinate of the point of the luminance gradation value PL (point of the luminance gradation value NL). Thus, C=DL/(DL+DR).

Assume that the luminance gradation values PL, PR, NL, and NR have a fluctuation of only image capturing element noise G. At this time, even the intersection point position has a fluctuation of only a width ΔC. This width is the sub-pixel position estimation error of the intersection point. The sub-pixel position estimation error ΔC can be calculated by:

$$\Delta C = \sigma/(DL+DR). \quad (2)$$

As the sub-pixel position estimation error ΔC of the intersection point becomes smaller, the distance measurement error becomes smaller. Equation (2) reveals that the sub-pixel position estimation error ΔC can be reduced by increasing the denominator (DL or DR value as the difference between luminance gradation values). The difference DL (DR) between luminance gradation values increases in proportion to the luminance gradation value. Further, a shot noise component out of the image capturing element noise σ often exhibits a characteristic in which the shot noise component is proportional to the value of the square root of the luminance gradation value. Hence, by increasing the luminance gradation value, the influence of the noise σ is relatively reduced. To increase the luminance gradation value, there are two methods: to increase the exposure amount in the image capturing unit 20, and to increase the brightness of pattern light.

Both or either of these two methods can be executed. In the embodiment, for example, only the method of controlling the exposure amount in the image capturing unit 20 is executed. Further, in the exposure amount control method, only the exposure time is controlled. However, control of the exposure amount can be implemented by a method other than control of the exposure time, and is not limited to a specific method. The control is applicable to even a method of controlling the image capturing stop 22, out of the exposure amount control method. The control is also applicable to control of the emission luminance of the light source 31, to control of the display gradation value of the display element 33, and to control of the projection stop 34, which is a method of controlling the brightness of pattern light. The method is not limited to a method of controlling only a single controlled variable, and a plurality of controlled variables can also be controlled simultaneously.

Figure 6A:
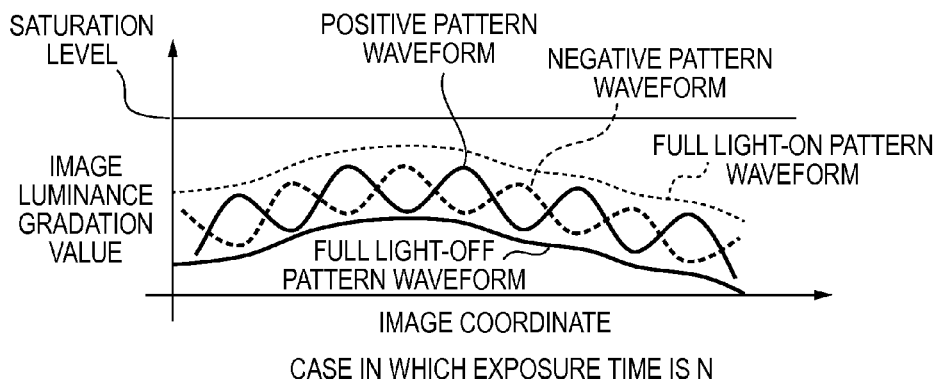
FIGS. 6A to 6C are graphs for explaining a change of the luminance gradation value upon changing the exposure time.

Next, a change of the luminance gradation value upon changing the exposure time will be described with reference to FIGS. 6A to 6C. N is the current exposure time. FIG. 6A shows the waveforms of the luminance gradation values of images captured in the exposure time N. In the state of FIG. 6A, none of the waveforms of the luminance gradation values reaches the saturation level, so there is room for improving the accuracy. It is not desired, however, to unnecessarily prolong the exposure time.

Figure 6B:
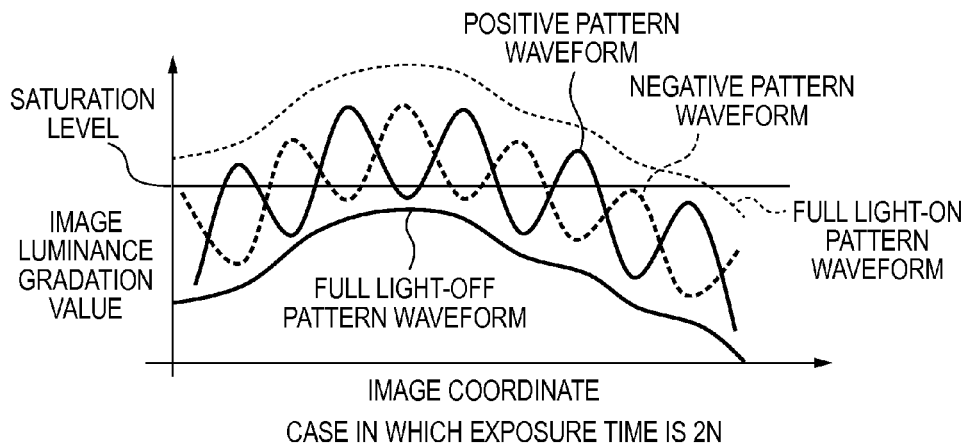

FIG. 6B shows the waveforms of luminance gradation values when the exposure time is doubled to be 2N. The waveforms exceed the saturation level at the center. FIG. 6B shows the waveforms exceeding the saturation level for convenience. In practice, a waveform exceeding the saturation level is cut at the luminance gradation value of the saturation level and output. In FIG. 6B, the intersection point position is cut at the luminance gradation value of the saturation level, and cannot be specified. To achieve both specifying of the intersection point position and reduction of the sub-pixel estimation error, a state is desirable, in which a luminance gradation value near the intersection point position used to specify a pattern position in the waveform of the luminance gradation value is adjusted to a level, one step short of the saturation level.

Figure 6C:
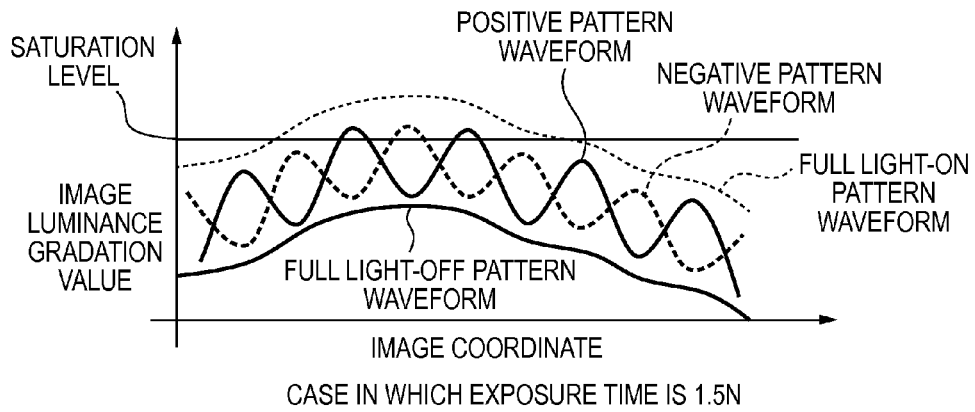

FIG. 6C shows the waveforms of luminance gradation values when the exposure time is multiplied by 1.5 to be 1.5N. In FIG. 6C, the waveform of the full light-on pattern and the waveforms of the positive and negative patterns partially exceed the saturation level, but a luminance gradation value near an intersection point position used to specify a pattern position does not exceed the saturation level. For this reason, the intersection point position can be specified, and the sub-pixel position estimation error can be reduced, because the luminance gradation value near the intersection point becomes large.

Figure 7:
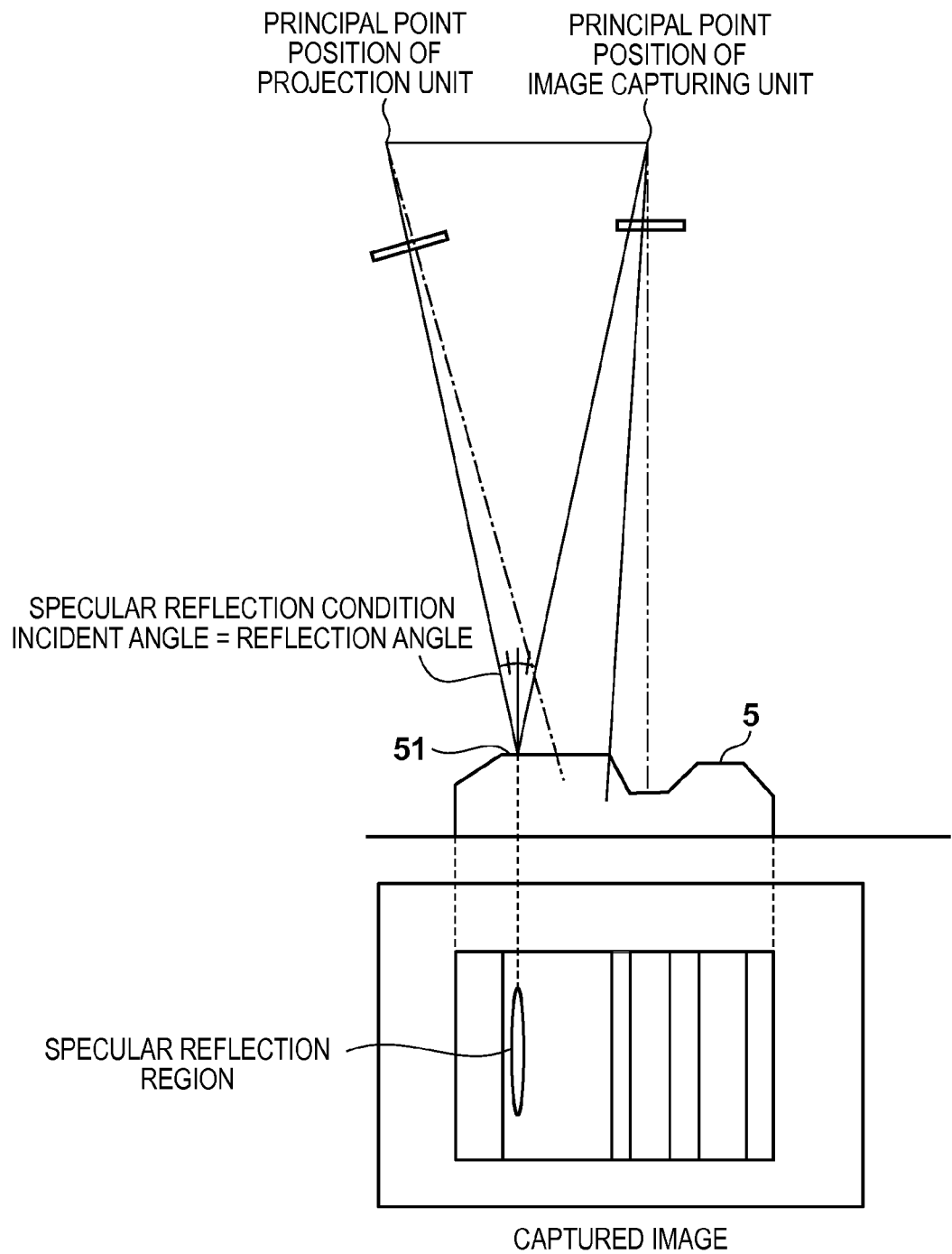
FIG. 7 is a view for explaining a case in which a highly glossy target object is used as the target object 5.

Note that, when a highly glossy target object, such as a metal, is used as the target object 5, the specular reflection condition is established at only part of the target object, and the luminance gradation value may become greatly large. FIG. 7 shows an example of this. Assume that, at a point 51 on the target object 5 that is a highly glossy target object, the specular reflection condition is established between incident light from the projection unit and reflected light toward the image capturing unit. The specular reflection condition is a condition that the incident angle of incident light and the reflection angle of reflected light become equal. At this time, when the glossiness of the target object 5 is high, reflected light from this region becomes brighter than the peripheral light, and as a result, the luminance gradation value becomes greatly large. If the luminance value at this portion is adjusted not to reach the saturation level, the luminance of the entire image excluding this portion decreases, and the distance measurement accuracy of the entire image decreases. To solve this, the embodiment introduces a mechanism that permits a certain number of pixels with respect to the total number of pixels of an entire target region (for example, a region including the target object 5) in an image to reach the saturation level. This mechanism will be explained in detail in a description regarding the bright/dark portion determination unit 42.

As described above, the embodiment provides a method of adjusting the exposure amount of a captured image and the brightness of pattern light so that the luminance gradation value of a pixel used to specify a pattern position is set to a level, one step short of the saturation level. Accordingly, the pattern position can be specified at high accuracy. Further, the embodiment provides a method of setting the permissible range of the saturation level to improve, even for a target object in which the luminance gradation value is excessively saturated in a partial region, the pattern position specifying accuracy in the entire image while sacrificing the partial region.

Figure 8:
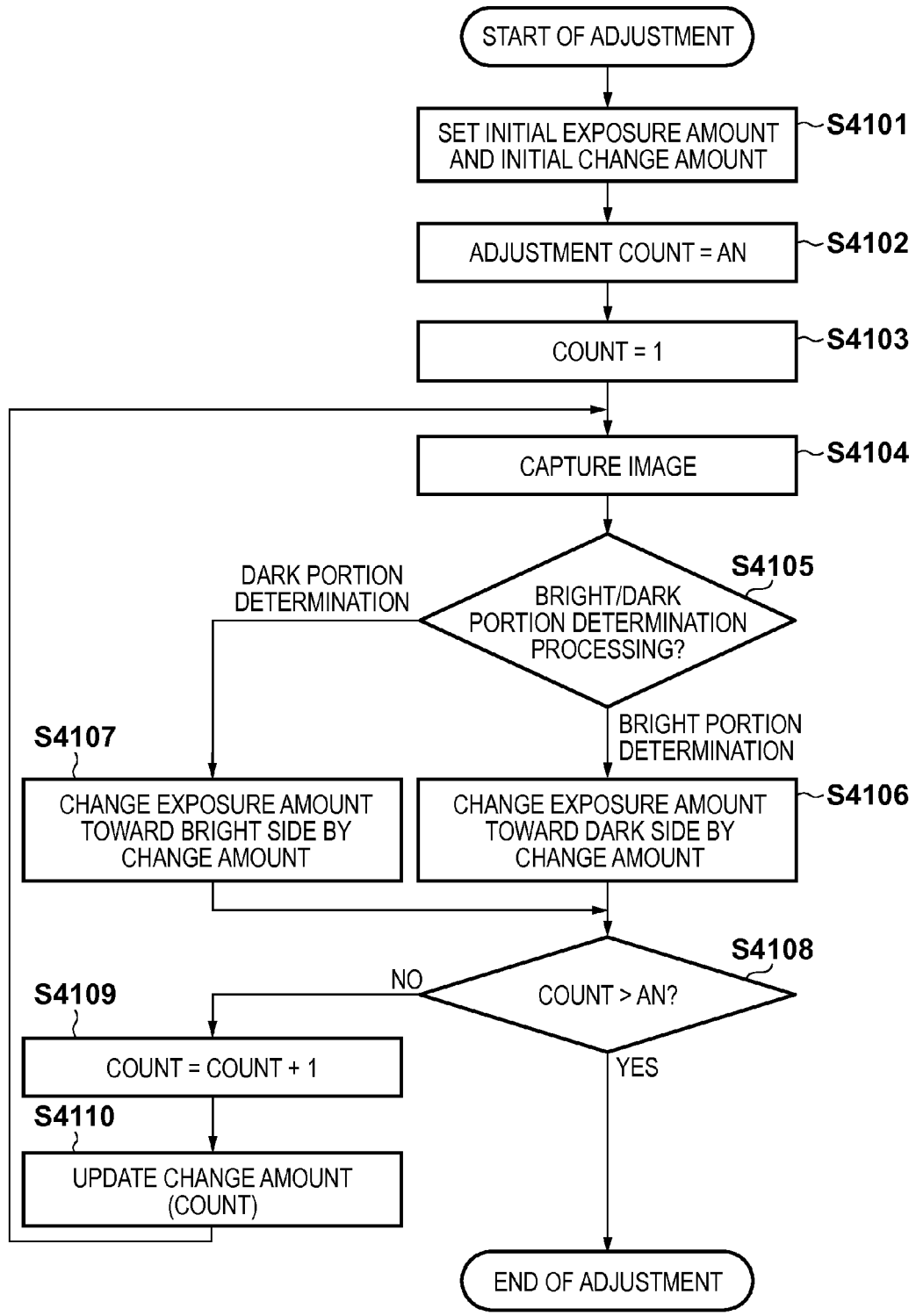
FIG. 8 is a flowchart showing processing to be performed by an image processing unit 40.

Next, processing to be performed by the image processing unit 40 in order to adjust the exposure amount of the image capturing unit 20 will be explained with reference to FIG. 8, showing the flowchart of this processing. First, in step S4101, the adjustment unit 41 sets the initial value (parameter) of the exposure amount that has been set in advance or set by the user via an operation unit (not shown). The captured image exposure amount control unit 46 controls the exposure amount of the image capturing unit 20 in accordance with the initial value of the exposure amount. The adjustment unit 41 sets the initial value (parameter) of the brightness of pattern light that has been set in advance or set by the user via the operation unit (not shown). The pattern light brightness control unit 45 controls the brightness of pattern light projected from the projection unit 30 in accordance with the initial value of the brightness of pattern light. The adjustment unit 41 sets the initial value (parameter) of the change amount of the exposure amount. The initial value of the change amount of the exposure amount suffices to be, for example, one half of the initial value of the exposure amount. Needless to say, the initial value of the change amount of the exposure amount is not limited to this.

In step S4102, the adjustment unit 41 sets a value AN (AN is an integer of two or more) as the upper limit value of the number of adjustments of the exposure amount. As the number of adjustments becomes larger, finer adjustment can be performed, but the time taken until the end of adjusting the exposure amount becomes longer. The number of adjustments is desirably about ten-odd, empirically. In step S4103, the adjustment unit 41 sets a value "1" in a counter k for counting the number of adjustments of the exposure amount.

In step S4104, the projection unit 30 sequentially selects one by one a plurality of projection patterns described above, and irradiates the target object 5 with the selected projection pattern. The image capturing unit 20 captures the target object 5. The types of projection patterns are four: a full light-on pattern, a full light-off pattern, a positive pattern (in FIGS. 2A to 2G, the four positive patterns in FIGS. 2C to 2F), and a negative pattern (in FIGS. 2A to 2G, the negative pattern in FIG. 2G). The four-bit space encoding method uses a four-bit positive pattern as the positive pattern, and a four-bit negative pattern as the negative pattern. The image capturing unit 20 captures the target object 5 every time the selected pattern light is projected.

In step S4105, the bright/dark portion determination unit 42 and pattern position specifying unit 43 perform bright/dark portion determination using an image captured by the image capturing unit 20. Details of the processing in step S4105 will be described later with reference to the flowchart of FIG. 9. If it is determined as a result of the bright/dark portion determination that the pixel is the bright portion, the process advances to step S4106. If it is determined that the pixel is the dark portion, the process advances to step S4107.

In step S4106, the adjustment unit 41 changes, by the change amount, the parameter representing the current exposure amount of the image capturing unit 20 so that an image to be captured next time by the image capturing unit 20 becomes darker than the currently captured image. The captured image exposure amount control unit 46 controls the exposure amount of the image capturing unit 20 in accordance with the adjusted parameter.

In step S4107, the adjustment unit 41 changes, by the change amount, the parameter representing the current exposure amount of the image capturing unit 20, so that an image to be captured next time by the image capturing unit 20 becomes brighter than the currently captured image. The captured image exposure amount control unit 46 controls the exposure amount of the image capturing unit 20 in accordance with the adjusted parameter.

In step S4108, the adjustment unit 41 determines whether the value of the counter k has exceeded AN. If it is determined that k>AN, the process ends. If it is determined that k≤AN, the process advances to step S4109.

In step S4109, the adjustment unit 41 increments the value of the counter k by one. In step S4110, the adjustment unit 41 updates the change amount of the exposure amount. It is desirable to gradually decrease the change amount as the number of adjustments increases. For example, a method such as binary search is conceivable. According to this method, the change amount is updated to one half of the previous change amount.

After the change amount is updated in step S4110, the processes in steps S4104 to S4110 are repetitively executed while k≤AN is satisfied. As the number of adjustments increases, the exposure amount is updated searchingly and comes close to an appropriate exposure amount.

Next, details of the above-described processing in step S4105 will be explained with reference to the flowchart of FIG. 9. The bright/dark portion determination unit 42 performs bright/dark portion determination by using four captured images In1 to In4, and outputs either of Out1: dark portion determination and Out2: bright portion determination as the result of bright/dark portion determination. The captured image In1 is a captured image of the target object 5 to which the full light-on pattern has been projected. The captured image In2 is a captured image of the target object 5 to which the full light-off pattern has been projected. The captured image In3 is a captured image of the target object 5 to which the positive pattern has been projected. The captured image In4 is a captured image of the target object 5 to which the negative pattern has been projected.

The bright/dark portion determination is executed in two stages. In the first stage, rough bright/dark portion determination is performed using the captured images In1 and In2. In the second stage, detailed bright/dark portion determination is performed using the captured images In3 and In4. In the description of the embodiment, bright/dark portion determination is performed in the two, first and second stages. It is also possible, however, to omit bright/dark portion determination in the first stage and to perform only bright/dark portion determination in the second stage.

Bright/dark portion determination in the first stage will be explained first.

In step S4201, the bright/dark portion determination unit 42 sets an adjustment region in the captured image In1 or In2. For example, either the captured image In1 or In2 is displayed as a display target image on a display unit (not shown), and the user operates an operation unit (not shown) to designate (set), as the adjustment region, the region of the target object 5 in the display target image. As a matter of course, the adjustment region setting method is not limited to this. When the region of the target object 5 in the captured image In1 or In2 has been determined in advance or is determined by recognition processing, the region of the target object 5 may be set as the adjustment region without the intervention of the user operation. Assume that, when the adjustment region is set in one captured image, it is also set at the same position in the other captured image. In step S4202, the bright/dark portion determination unit 42 counts the number of pixels in the adjustment region as the "number X of pixels in the adjustment region".

In step S4203, the bright/dark portion determination unit 42 detects a region (shadow region) seemed to be a shadow from the adjustment region in the captured image In1 or the adjustment region in the captured image In2. For example, the shadow region detection method is as follows. More specifically, the difference value of the luminance gradation value, between pixels whose positions correspond to each other, among pixels within the adjustment region in the captured image In1 and pixels within the adjustment region in the captured image In2, is calculated. A region formed from pixels at pixel positions at which the difference value is less than a preset threshold (shadow region threshold) is determined as the shadow region. The difference value, however, becomes small even in a case in which the luminance gradation value within the adjustment region in the captured image In2 is close to or has reached the saturation level. By only the above determination method, such a region is determined as the shadow region. To cope with this case, it is better to introduce a determination equation in which, when a value obtained by adding the value of the shadow region threshold to the luminance gradation value of the captured image In2 exceeds the saturation level, excluding the luminance gradation value from the shadow region. Needless to say, the method of specifying a shadow region from an image is not limited to the above-described method.

In step S4204, the bright/dark portion determination unit 42 obtains, as the number Y of pixels in a non-shadow region, the remaining number of pixels by subtracting the number of pixels in the shadow region detected in step S4203 from the number of pixels in the adjustment region counted in step S4202. The number of pixels in the non-shadow region is the number of pixels in a remaining region obtained by excluding the shadow region from the adjustment region.

In step S4205, the bright/dark portion determination unit 42 determines whether a value (ratio of the number Y of pixels in the non-shadow region to the number X of pixels in the adjustment region) obtained by dividing the number Y of pixels in the non-shadow region by the number X of pixels in the adjustment region has exceeded a preset threshold A. When the shadow region occupies a large part of the adjustment region, Y/X takes a relatively small value. If Y/X≤the threshold A (equal to or lower than the threshold), the shadow region occupies a large part of the adjustment region. Therefore, the bright/dark portion determination unit 42 outputs the "dark portion determination (Out1)" as the bright/dark portion determination result.

To the contrary, when the non-shadow region occupies a large part of the adjustment region, Y/X takes a relatively large value. Thus, if Y/X>the threshold A, the process advances to step S4206 in order to execute bright/dark portion determination in the second stage.

Subsequently, bright/dark portion determination in the second stage will be explained. Bright/dark portion determination in the second stage uses the captured images In3 and In4, as described above. In step S4206, the pattern position specifying unit 43 performs processing of estimating the aforementioned intersection point position as a pattern position within the adjustment region in the captured image In3 (captured image In4). For example, P1 is a luminance gradation value at a pixel position (x−1, y) in the captured image In3, and P2 is a luminance gradation value at a pixel position (x+1, y) in the captured image In3. Q1 is a luminance gradation value at a pixel position (x−1, y) in the captured image In4, and Q2 is a luminance gradation value at a pixel position (x+1, y) in the captured image In4. At this time, "if P1>Q1, then P2<Q2" (condition 1) or "if P1<Q1, then P2>Q2" (condition 2) is satisfied, it is determined that the pixel position (x, y) is an intersection point position. If neither condition 1 nor 2 is satisfied, it is determined that the pixel position (x, y) is not an intersection point position. In this manner, whether each pixel position is an intersection point position can be determined by performing this condition determination for all pixel positions (x, y) within the adjustment region in the captured image In3 (captured image In4). In step S4207, the pattern position specifying unit 43 counts, as the "number Z of measurement pixels", the number of intersection point positions (measurement pixels) estimated in step S4206.

In step S4208, the bright/dark portion determination unit 42 determines whether a value (ratio of the number Z of the measurement pixels to the number Y of pixels in the non-shadow region: equivalent to the detection amount of measurement pixels) obtained by dividing the number Z of the measurement pixels by the number Y of pixels in the non-shadow region has exceeded a preset threshold B. When the ratio of the number of intersection point positions to the number of pixels in the non-shadow region is low, it is considered that not so many intersection point positions have been obtained, because the luminance gradation values of many pixels in the adjustment region have reached the saturation level. For example, the luminance gradation values of pixels at intersection point positions have exceeded the saturation level near the center in FIG. 6B. As a result, these intersection point positions cannot be obtained, and the Z/Y value becomes relatively small. If Z/Y≤the threshold B, the bright/dark portion determination unit 42 outputs the "bright portion determination (Out2)" as the bright/dark portion determination result. If Z/Y>the threshold B, many intersection point positions can be calculated, and the process advances to step S4209.

In step S4209, the bright/dark portion determination unit 42 determines, for each intersection point position, whether the luminance gradation value of a pixel at a position near the intersection point position has been saturated. More specifically, the bright/dark portion determination unit 42 refers to the luminance gradation values of two points on the positive pattern waveform and two points on the negative pattern waveform, that is, a total of four points (in FIG. 5B, four points having the luminance gradation values PR, PL, NR, and NL) that are close to the intersection point position. If these four points include one or more points at which the luminance gradation value becomes equal to or greater than the saturation level, the pixel at the intersection point position is determined as a saturation measurement pixel. This processing is performed for each obtained intersection point position. In step S4210, the bright/dark portion determination unit 42 counts, as the "number g of saturation measurement pixels", the number of pixels determined as saturation measurement pixels in step S4209.

In step S4211, the bright/dark portion determination unit 42 determines whether a value (ratio of the number g of saturation measurement pixels to the number Z of measurement pixels) obtained by dividing the "number g of saturation measurement pixels" by the "number Z of measurement pixels" has exceeded a preset threshold C. If g/Z>the threshold C, the bright/dark portion determination unit 42 outputs the "bright portion determination (Out2)" as the bright/dark portion determination result. If g/Z≤the threshold C, the bright/dark portion determination unit 42 outputs the "dark portion determination (Out1)" as the bright/dark portion determination result.

As described above, for a highly glossy target object, such as a metal, the luminance gradation value becomes greatly large at a portion at which the specular reflection condition is established between incident light and reflected light. The mechanism that permits a certain number of neighboring pixels exceeding the saturation level is introduced in steps S4209 to S4211. Thus, even for a highly glossy target object, bright/dark portion determination can be performed appropriately without the influence of the specular reflection region. As a result, exposure amount adjustment processing functions properly even for a highly glossy part.

Modification

The first embodiment has described a method in which the intersection point position between the positive pattern waveform and the negative pattern waveform in the space encoding method is used to specify a pattern position. However, the pattern position specifying method is not limited to this. For example, the pattern position may be specified using the peak position of the luminance gradation waveform. As pattern light, for example, pattern light formed from a plurality of line beams shown in FIG. 14 is usable. As the method of obtaining a peak position from the luminance gradation waveform, a method of obtaining the difference value (differential value) of the luminance gradation waveform and setting, as a peak position, a position at which the difference value becomes zero is adopted in many cases.

Figure 15A:
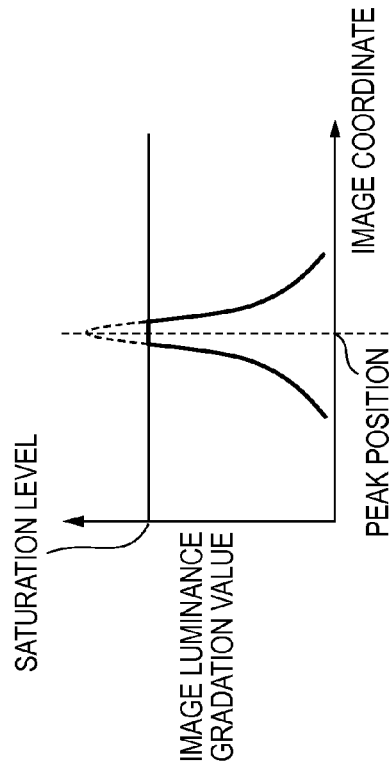
FIGS. 15A to 15D are graphs showing the luminance gradation value and difference value.
Figure 15B:
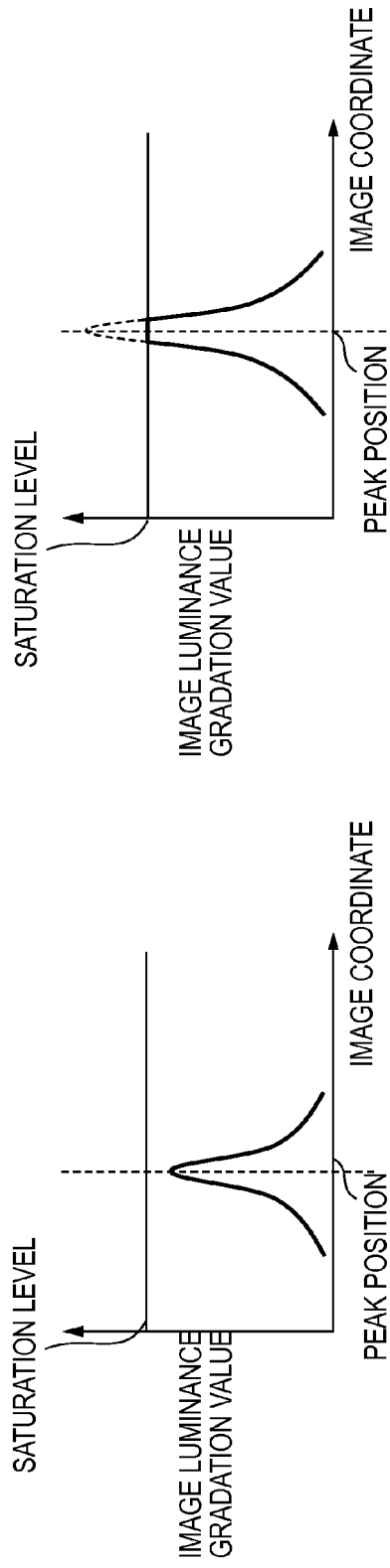

FIGS. 15A and 15B are graphs in which the abscissa represents the image coordinate, and the ordinate represents the luminance gradation value. FIGS. 15A and 15B are enlarged views showing a range near the peak position.

Figure 15C:
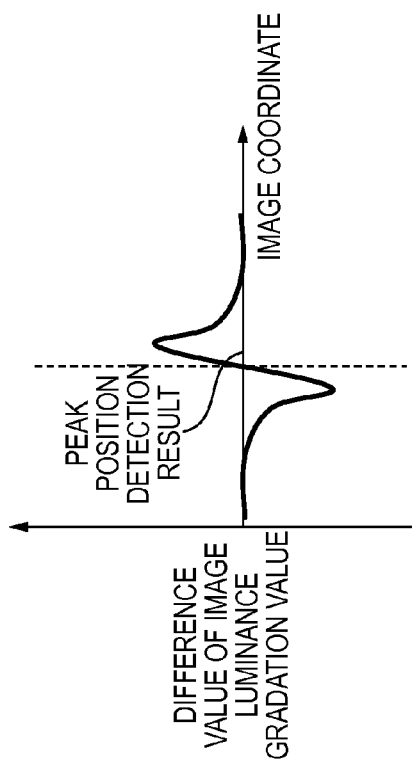
Figure 15D:
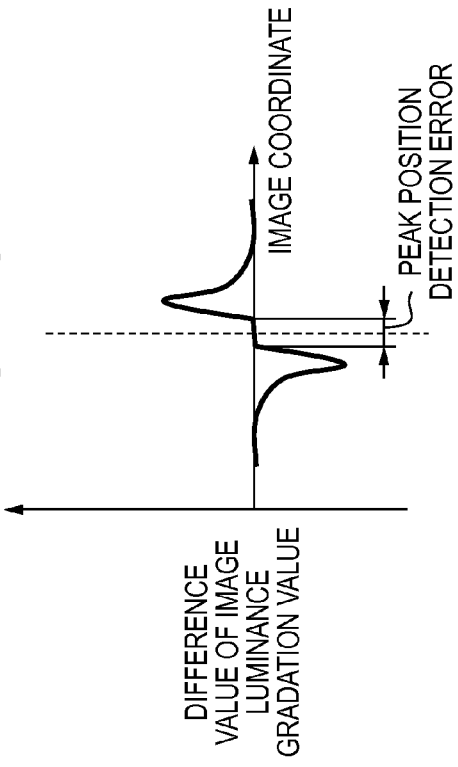

FIGS. 15C and 15D are graphs in which the abscissa represents the image coordinate, and the ordinate represents the difference value of the luminance gradation value. The difference value is the difference between the luminance gradation values of a pixel of interest and an adjacent pixel.

FIG. 15A shows a luminance gradation waveform that does not exceed the saturation level, and FIG. 15C shows the waveform of the difference value of a corresponding image luminance gradation value. FIG. 15B shows a luminance gradation waveform that exceeds the saturation level, and FIG. 15D shows the waveform of the difference value of a corresponding image luminance gradation value.

As is apparent from FIG. 15C, the peak position detection result is obtained uniquely. In FIG. 15D, the luminance gradation waveform in FIG. 15B is cut at the saturation level, the range in which the difference value becomes zero is wide, and the peak position detection result error becomes large. Even when the luminance gradation waveform does not exceed the saturation level, the peak position detection accuracy becomes higher as the luminance gradation value becomes larger, because of the influence of noise of the image capturing element. That is, even in the method of specifying the position of pattern light by peak position detection, a state is desirable, in which the luminance gradation value is adjusted to a level, one step short of the saturation level. The outlines of the above-described bright/dark portion determination processing and the processing in the adjustment unit are applicable. Bright/dark portion determination processing in the modification is different from the first embodiment in the following point.

In the first embodiment, the captured images In3 and In4 are necessary to obtain an intersection point position in the space encoding method. However, in this modification (method using a peak position), only the captured image of the target object 5 to which pattern light shown in FIG. 14 has been projected is used. In the processing of step S4206, the position of a pixel in which the differential value of the luminance gradation value becomes zero in a captured image is specified instead of the intersection point position. Subsequent processing is the same as that in the first embodiment.

Since the exposure amount is adjusted based on the luminance gradation value of a pixel used for measurement, the measurement accuracy can be improved. Also, since the mechanism that permits a certain number of pixels to exceed the saturation level is further employed, the exposure amount can be adjusted to improve the measurement accuracy of the entire image even for a highly glossy part.

In the first embodiment, exposure amount adjustment based on a search is executed. The search is accompanied by a plurality of times of image capturing, and thus, takes time for the exposure amount adjustment, but is effective when there is no knowledge about a target object. The search is also effective when the relationship between the adjustment parameter and the luminance of a captured image is unclear.

Second Embodiment

An example of the functional arrangement of an image processing apparatus according to the second embodiment will be described with reference to the block diagram of FIG. 10. In FIG. 10, the same reference numerals as those in FIG. 1 denote the same functional units, and a description regarding these functional units will not be repeated. In an arrangement shown in FIG. 10, an appropriate exposure amount calculation unit 47 replaces the bright/dark portion determination unit 42 in the arrangement of FIG. 1.

The appropriate exposure amount calculation unit 47 calculates the next appropriate exposure amount from an image captured by an image capturing unit 20 in accordance with an initial exposure amount. Unlike the first embodiment, the second embodiment does not require search, so the time taken for adjustment is shortened, but the initial exposure amount needs to have been adjusted to a proper range to some extent. In addition, the relationship between the adjustment parameter and the luminance gradation value needs to be grasped. If the exposure time of the image capturing unit is an adjustment parameter, the linearity is high so that when the exposure time is doubled, the luminance gradation value of a captured image is also almost doubled. The exposure time is, therefore, a desirable adjustment parameter to which the embodiment is applied. The adjustment parameter to which the embodiment is applicable, however, is not limited to one having high linearity. It is only necessary to find out in advance the relationship between the adjustment parameter and the luminance gradation value. For example, when an LED is used as a light source, the relationship between the current value and the luminance gradation value is generally nonlinear. At this time, the relationship between the LED current value and the luminance gradation value is measured in advance.

Figure 11:
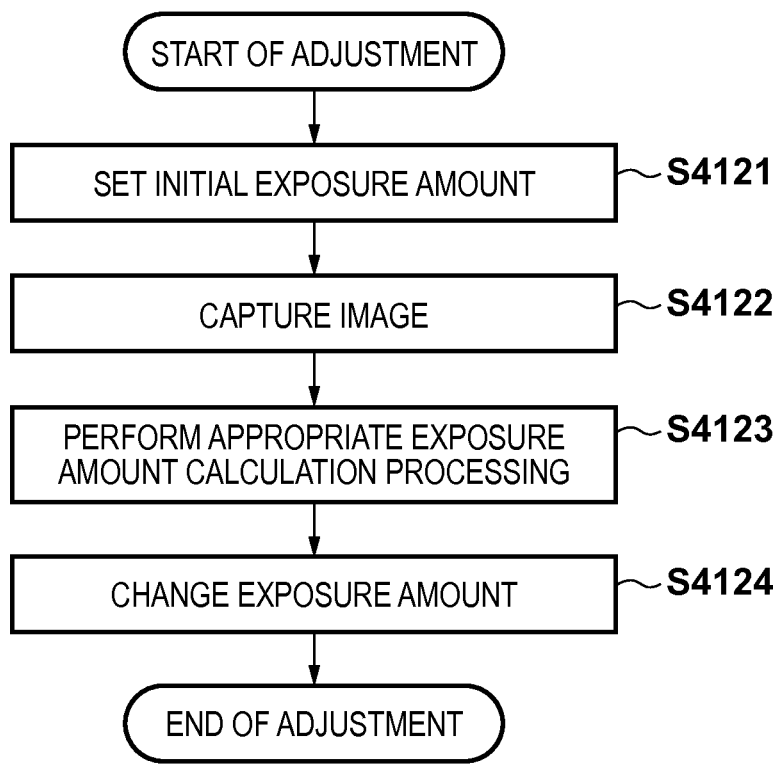
FIG. 11 is a flowchart showing processing to be performed by the image processing unit 40.

Processing to be performed by an image processing unit 40 according to the embodiment in order to adjust the exposure amount will be explained with reference to FIG. 11 showing the flowchart of this processing. In step S4121, an adjustment unit 41 sets the initial value (parameter) of the exposure amount that has been set in advance or set by the user via an operation unit (not shown). Assume that the initial exposure amount in the embodiment has been adjusted in advance to a proper range to some extent. For example, exposure amount adjustment according to the first embodiment is executed in advance and set as the initial exposure amount. In accordance with the initial value of the exposure amount, a captured image exposure amount control unit 46 controls the exposure amount of the image capturing unit 20. The adjustment unit 41 sets the initial value (parameter) of the brightness of pattern light that has been set in advance or set by the user via the operation unit (not shown). A pattern light brightness control unit 45 controls the brightness of pattern light projected from a projection unit 30 in accordance with the initial value of the brightness of pattern light.

In step S4122, the projection unit 30 sequentially selects one by one positive and negative patterns, and irradiates a target object 5 with the selected projection pattern. The image capturing unit 20 captures the target object 5. The four-bit space encoding method uses a four-bit pattern. The image capturing unit 20 captures the target object 5 every time the selected pattern light is projected.

In step S4123, the appropriate exposure amount calculation unit 47 and a pattern position specifying unit 43 perform processing of calculating an appropriate exposure amount (parameter) using an image captured by the image capturing unit 20. Details of the processing in step S4123 will be described later with reference to the flowchart of FIG. 12. In step S4124, the captured image exposure amount control unit 46 controls, in accordance with the parameter calculated in step S4123, an exposure amount at the time of image capturing by the image capturing unit 20.

Figure 12:
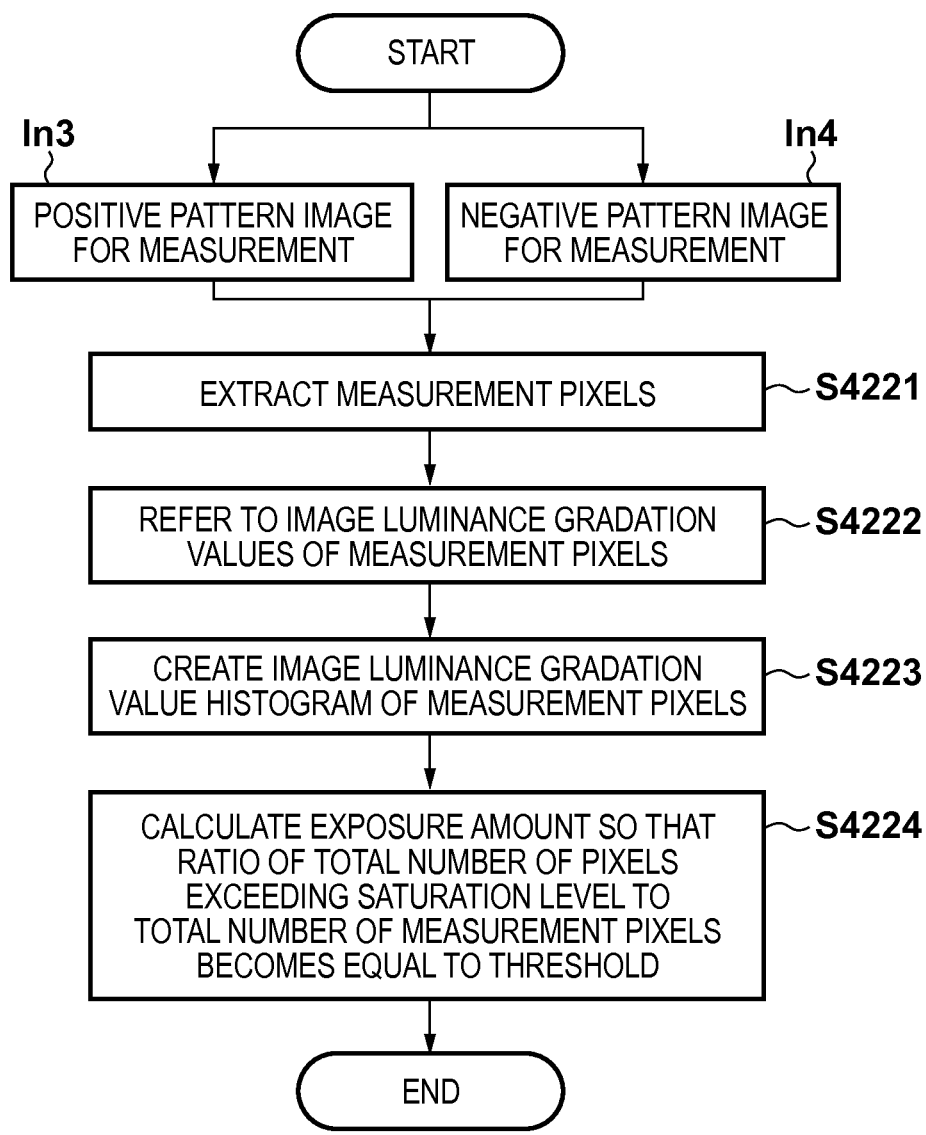
FIG. 12 is a flowchart showing details of processing in step S4123.

Details of the processing in step S4123 will be described later with reference to the flowchart of FIG. 12. In step S4221, the pattern position specifying unit 43 performs processing of estimating the above-mentioned intersection point position within an adjustment region in a captured image In3 (captured image In4) similarly to the processing in step S4206.

In step S4222, the appropriate exposure amount calculation unit 47 refers to the luminance gradation values of two points on the positive pattern waveform and two points on the negative pattern waveform, that is, a total of four points (in FIG. 5B, four points having luminance gradation values PR, PL, NR, and NL) that are close to the intersection point position. A maximum value out of the referred luminance gradation values at the four points is set as a luminance gradation value at this intersection point position. This processing is performed for each intersection point position.

In step S4223, the appropriate exposure amount calculation unit 47 creates the histogram (distribution) of luminance gradation values obtained in step S4222 for respective intersection point positions. In step S4224, the appropriate exposure amount calculation unit 47 calculates an exposure amount with which a value obtained by dividing, by the total number of intersection point positions, the number of intersection point positions (number of pixels) each having a luminance gradation value equal to or larger than the saturation level in the histogram becomes equal to a specific threshold within a specific range.

Figure 13A:
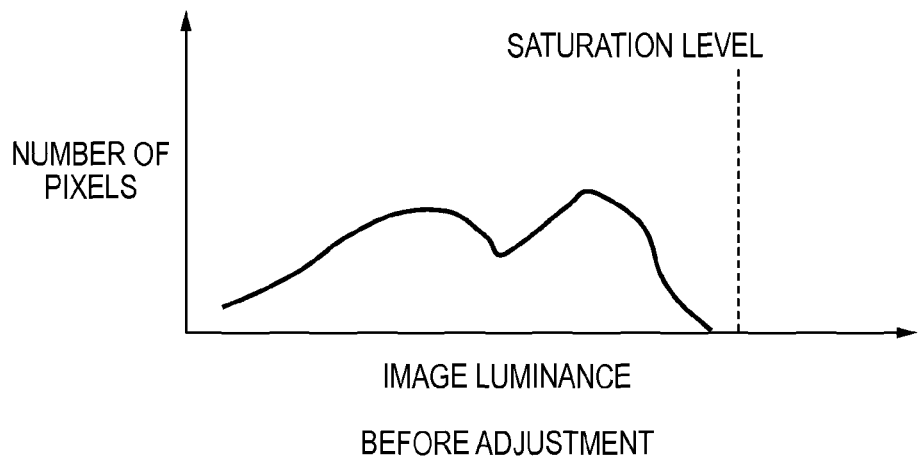
FIGS. 13A and 13B are graphs for explaining processes in steps S4222 and S4223.
Figure 13B:
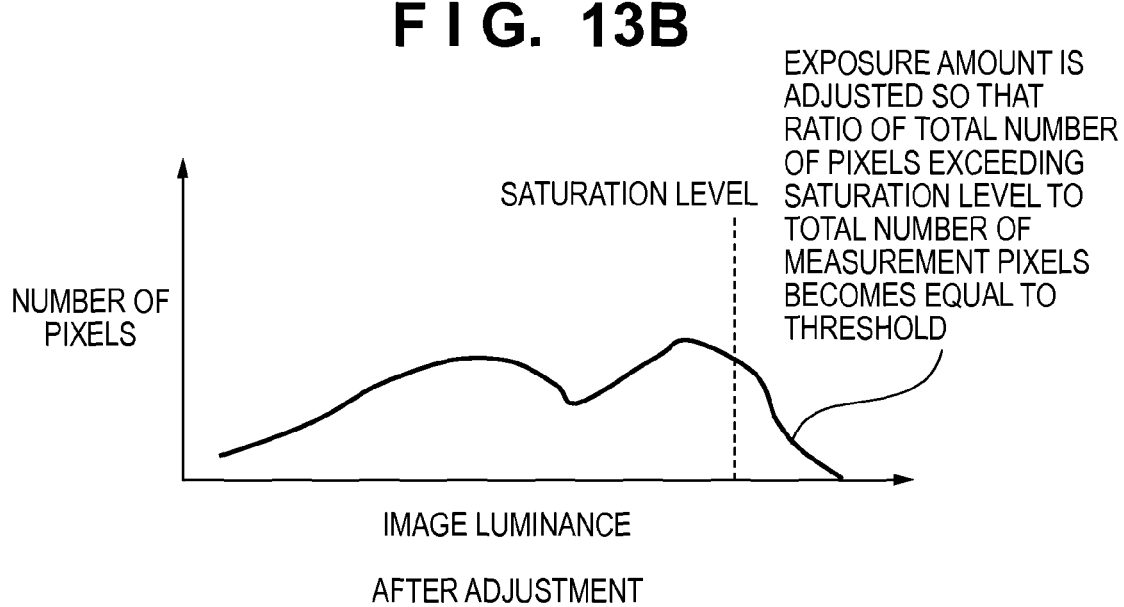

The processes in steps S4222 and S4223 will be explained with reference to FIGS. 13A and 13B. FIG. 13A shows a histogram before adjustment. Note that the abscissa represents the luminance gradation value, and the ordinate represents the number of pixels. The relationship between the luminance gradation value and the adjustment parameter has been grasped in advance. For this reason, an adjustment parameter at which (total number of pixels equal to or higher than the saturation level)/(total number of measurement pixels) threshold is uniquely determined. FIG. 13B shows a histogram after adjustment. In accordance with the calculated parameter, the captured image exposure amount control unit 46 controls an exposure amount at the time of image capturing by the image capturing unit 20.

In the description of the embodiment, only the exposure amount is adjusted. However, the parameter for the projection unit 30 may be adjusted, or both the exposure amount and the parameter for the projection unit 30 may be adjusted.

Third Embodiment

Each functional unit constituting an image processing unit 40 may be constituted by hardware or software (computer program). In this case, an apparatus that executes the computer program upon installing the computer program is applicable to the image processing unit 40. An example of the hardware arrangement of the apparatus applicable to the image processing unit 40 will be described with reference to the block diagram of FIG. 16.

A CPU 1601 controls the operation of the whole apparatus by executing processing using computer programs and data stored in a RAM 1602 and ROM 1603. In addition, the CPU 1601 executes each processing that is performed by the image processing unit 40 in the above description.

The RAM 1602 has an area for temporarily storing computer programs and data loaded from an external storage device 1606, data externally received via an OF (interface) 1607, and the like. Further, the RAM 1602 has a work area used when the CPU 1601 executes various processes. That is, the RAM 1602 can appropriately provide various areas. The ROM 1603 stores, for example, the setting data and boot program of the apparatus.

An operation unit 1604 is constituted by a keyboard, mouse, and the like. The user of the apparatus can operate the operation unit 1604 to input various instructions to the CPU 1601. For example, the above-described adjustment region can be designated by operating the operation unit 1604.

A display unit 1605 is constituted by a CRT, a liquid crystal display, or the like, and can display the result of processing by the CPU 1601 as an image, a character, or the like. For example, the display unit 1605 can display a screen for designating an adjustment region, including captured images In1 and In2.

The external storage device 1606 is a large-capacity information storage device typified by a hard disk drive device. The external storage device 1606 saves computer programs and data for causing the CPU 1601 to execute an OS (Operating System), or each processing that is performed by each functional unit in the image processing unit 40 shown in FIG. 1 or FIG. 10 in the above description. The data even include information that has been explained as known information in the above description. The computer programs and data saved in the external storage device 1606 are properly loaded to the RAM 1602 under the control of the CPU 1601, and are processed by the CPU 1601.

The OF 1607 is used when the apparatus communicates with an external device. For example, an image capturing unit 20 or projection unit 30 described above can be connected to the OF 1607. All of the above-mentioned units are connected to a bus 1608.

Fourth Embodiment

Figure 17:
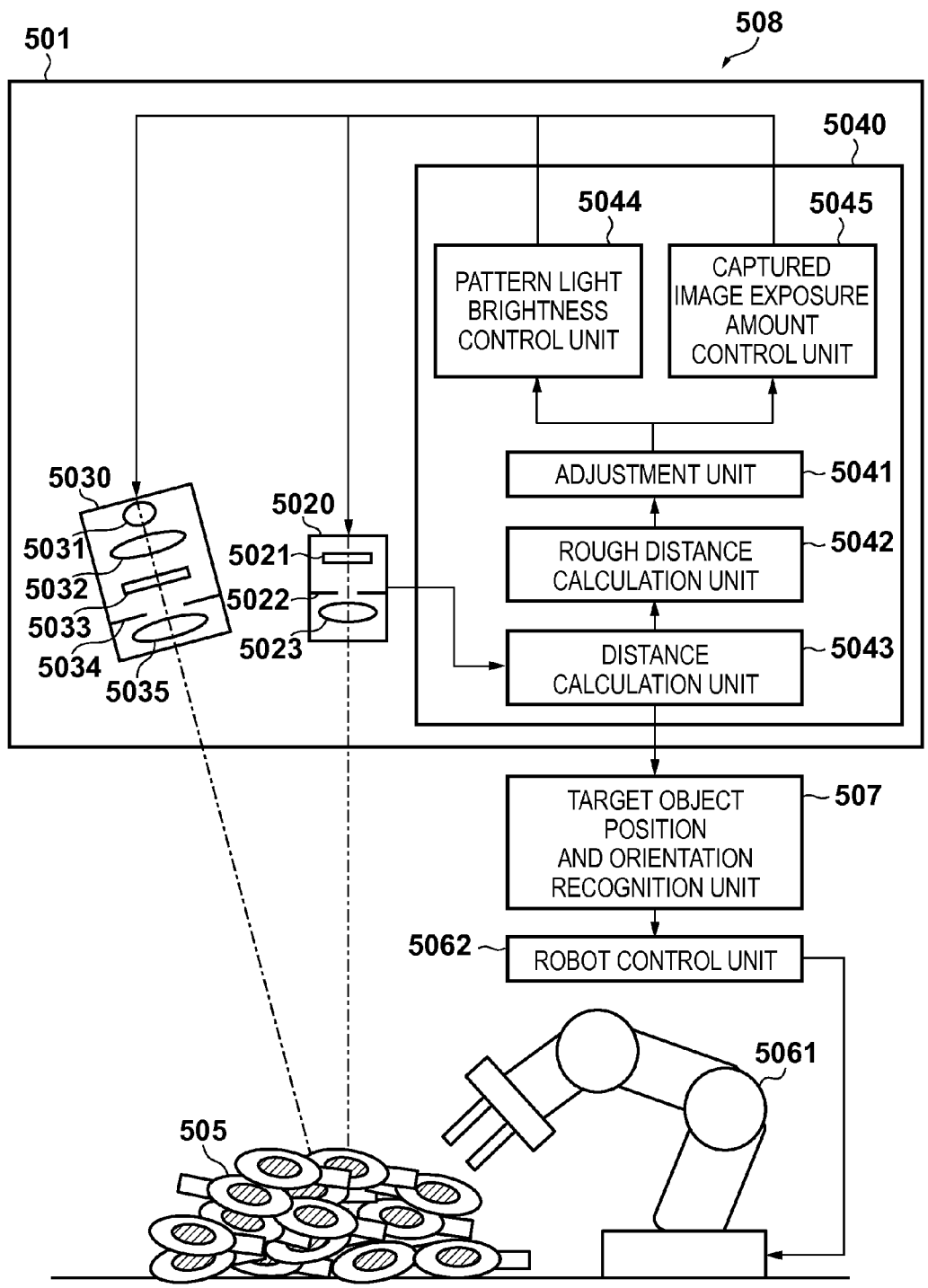
FIG. 17 is a block diagram showing an example of the functional arrangement of a target object picking system 508.

An example of the functional arrangement of a target object picking system 508 according to the fourth embodiment will be described with reference to the block diagram of FIG. 17. The target object picking system 508 includes an image processing apparatus (distance measurement apparatus) 501, a target object position and orientation recognition unit 507 that recognizes the position and orientation of a target object 505 by using the result of distance measurement by the image processing apparatus 501, a robot control unit 5062 that controls a robot 5061 by using the recognition result, and the robot 5061. The robot 5061 is used to pick the target object 505.

The image processing apparatus 501 includes a projection unit 5030 that projects pattern light to the target object 505, an image capturing unit 5020 that captures the target object 505 to which the pattern light has been projected, and an image processing unit 5040 that controls the projection unit 5030 and image capturing unit 5020, and performs distance measurement with respect to the target object 505 based on the space encoding method.

First, the projection unit 5030 will be explained. As shown in FIG. 17, the projection unit 5030 includes a light source 5031, an illumination optical system 5032, a display element 5033, a projection stop 5034, and a projection optical system 5035.

The light source 5031 is, for example, one of various light emitting elements, such as a halogen lamp and an LED. The illumination optical system 5032 is an optical system having a function of guiding light emitted by the light source 5031 to the display element 5033. For example, an optical system suited to make uniform the luminance, such as Koehler illumination or a diffusion plate, is used. The display element 5033 is an element having a function of spatially controlling the transmittance or reflectance of light traveling from the illumination optical system 5032 in accordance with a supplied pattern. For example, a transmission LCD, a reflection LCOS, or a DMD is used. As for supply of a pattern to the display element 5033, a plurality of types of patterns held in the projection unit 5030 may be sequentially supplied to the display element 5033. Alternatively, a plurality of types of patterns held in an external apparatus (for example, the image processing unit 5040) may be sequentially acquired and supplied to the display element 5033. The projection optical system 5035 is an optical system configured to form light (pattern light) guided from the display element 5033 into an image at a specific position of the target object 505. The projection stop 5034 is used to control the F-number of the projection optical system 5035.

Next, the image capturing unit 5020 will be explained. As shown in FIG. 17, the image capturing unit 5020 includes an image capturing optical system 5023, an image capturing stop 5022, and an image capturing element 5021. The image capturing optical system 5023 is an optical system configured to image a specific position of the target object 505 on the image capturing element 5021. The image capturing stop 5022 is used to control the F-number of the image capturing optical system 5023. The image capturing element 5021 is, for example, one of various photoelectric conversion elements such as a CMOS sensor and a CCD sensor. Note that an analog signal photoelectrically converted by the image capturing element 5021 is sampled and quantized by a control unit (not shown) in the image capturing unit 5020, and is converted into a digital image signal. Further, the control unit generates, from the digital image signal, an image (captured image), in which each pixel has a luminance gradation value (density value and pixel value). The control unit appropriately sends the captured image to a memory in the image capturing unit 5020 or to the image processing unit 5040.

Note that the image capturing unit 5020 captures the target object 505 every time the projection unit 5030 projects different pattern light. More specifically, the image capturing unit 5020 and projection unit 5030 operate synchronously, and the image capturing unit 5020 can capture the image of the target object 505 to which each different pattern light has been projected.

Next, the image processing unit 5040 will be explained. As shown in FIG. 17, the image processing unit 5040 includes an adjustment unit 5041, a rough distance calculation unit 5042, a distance calculation unit 5043, a pattern light brightness control unit 5044, and a captured image exposure amount control unit 5045.

The adjustment unit 5041 determines parameters for controlling the bright/dark portion of an image to be captured a next time by the image capturing unit 5020. The "parameters for controlling the bright/dark portion of an image to be captured a next time by the image capturing unit 5020" include a parameter for the image capturing unit 5020, and a parameter for the projection unit 5030. Both or either of the parameters may be determined.

The distance calculation unit 5043 acquires an image captured by the image capturing unit 5020 every time the projection unit 5030 projects each of a plurality of types of pattern beams. Then, the distance calculation unit 5043 measures (derives) a distance from the image capturing unit 5020 (image capturing optical system 5023) to the target object 505 by the triangulation principle using a space code decoded from the acquired captured image, and a pattern position specified for the acquired captured image. The rough distance calculation unit 5042 obtains a rough distance from the distance calculated by the distance calculation unit 5043.

When the adjustment unit 5041 determines the "parameter for the projection unit 5030", the pattern light brightness control unit 5044 controls the brightness of pattern light projected from the projection unit 5030 in accordance with the parameter. The method of controlling the brightness of pattern light includes, for example, the following three methods.

The first method is to control the emission luminance of the light source 5031. In the case of a halogen lamp, when the application voltage is increased, the emission luminance increases. In the case of an LED, when a current to be supplied is increased, the emission luminance increases. In this case, the "parameter for the projection unit 5030" is a parameter for controlling the emission luminance of the light source 5031.

The second method is to control the display gradation value of the display element 5033. In the case of an LCD, when the display gradation value is increased, the transmittance increases, and pattern light becomes bright. In the case of an LCOS, when the display gradation value is increased, the reflectance increases, and pattern light becomes bright. In the case of a DMD, when the display gradation value is increased, the ON count per frame increases, and pattern light becomes bright. In this case, the "parameter for the projection unit 5030" is a parameter for controlling the display gradation value of the display element 5033.

The third method is to control the projection stop 5034. When the stop is opened, pattern light becomes bright. To the contrary, when the stop is narrowed, pattern light becomes dark. When controlling the projection stop 5034, the depth of field of the projection optical system also changes, so this influence needs to be considered. More specifically, the resolution of pattern light is evaluated at each projection stop based on an index, such as the contrast of the image luminance waveform, and it is checked whether serious accuracy degradation will occur when performing distance measurement. In this case, the "parameter for the projection unit 5030" is a parameter for controlling the projection stop 5034.

When the adjustment unit 5041 determines the "parameter for the image capturing unit 5020", the captured image exposure amount control unit 5045 controls, in accordance with the parameter, an exposure amount at the time of image capturing by the image capturing unit 5020, thereby controlling the luminance gradation value of a captured image. The method of controlling the exposure amount of the image capturing unit 5020 includes, for example, the following three methods.

The first method is to control the exposure time (shutter speed) of the image capturing element 5021. When the exposure time is prolonged, the luminance gradation value of a captured image increases. In contrast, when the exposure time is shortened, the luminance gradation value decreases. In this case, the "parameter for the image capturing unit 5020" is a parameter for controlling the exposure time (shutter speed) of the image capturing element 5021.

The second method is to control the image capturing stop 5022. When the stop is opened, the luminance gradation value of a captured image increases. Conversely, when the stop is narrowed, the luminance gradation value of a captured image decreases. When controlling the image capturing stop 5022, the depth of field of the image capturing optical system also changes, so this influence needs to be considered. More specifically, the resolution of pattern light is evaluated at each image capturing stop based on an index such as the contrast of the image luminance waveform, and it is checked whether serious accuracy degradation will occur when performing distance measurement. In this case, the "parameter for the image capturing unit 5020" is a parameter for controlling the image capturing stop 5022.

The third method is to project the same pattern a plurality of times, to capture images, and to add image luminance values (composite captured images every time the pattern is projected). In the method of prolonging the exposure time, image saturation occurs owing to the dynamic range of the sensor. However, in the above-described method of projecting the same pattern a plurality of times, and generating one composite image by adding respective images captured in every projection, the exposure amount can be increased while preventing image saturation. In a composite image obtained by this method, the noise component of the image capturing element is reduced. More specifically, letting σb be the noise amount of the image capturing element at the time of capturing one image, a noise amount generated when images are captured N times and added is σb/√N. Although images are captured a plurality of times and added in the above description, the same effect can be obtained even by a method of calculating the average image of images captured a plurality of times.

The target object 505 is a set of target objects piled at random.

The target object position and orientation recognition unit 507 recognizes the position and orientation of the target object 505 (in practice, each target object observable from the image capturing unit 5020, out of the target object 505) in a coordinate system (robot coordinate system) handled by the robot 5061 by using the result of distance measurement by the image processing apparatus 501. As the position and orientation recognition method, various known recognition methods can be employed. For example, a method of recognizing the position and orientation of a target object by matching processing between a CAD model and 3D point group data based on the distance measurement result may be adopted.

Note that the target object position and orientation recognition unit 507 may be a unit in the image processing apparatus 501, or an apparatus separate from the image processing apparatus 501. In any case, the target object position and orientation recognition unit 507 may take any form as long as it can recognize the position and orientation of the target object 505 from the result of distance measurement by the image processing apparatus 501, and send the recognized position and orientation to the robot control unit 5062.

The robot control unit 5062 controls the robot 5061 in accordance with the position and orientation recognized by the target object position and orientation recognition unit 507, and causes the robot 5061 to pick the target object whose position and orientation have been recognized. The picked target object is carried to the next step. As target objects are picked, the height of the pile gradually decreases. Along with this, the distance from the image capturing unit 5020 increases.

Although distance measurement is performed based on the space encoding method in the embodiment, as described above, there are a plurality of derivative forms for the space encoding method. The embodiment adopts a method disclosed in Japanese Patent Laid-Open No. 2011-47931. The principle of this method has been described with reference to FIGS. 2A to 5B. The method is the same as that in the first embodiment, unless otherwise specified.

Assuming that many components of noise σ are shot noise, the brightness of pattern light or the exposure amount in the image capturing unit 5020 needs to be multiplied by n2 in order to reduce the error to 1/n. For example, to reduce the error to one half, the brightness of pattern light or the exposure amount in the image capturing unit 5020 is quadrupled. When the exposure amount is quadrupled, (DL+ DR) of the denominator is quadrupled. When the exposure amount is quadrupled, the noise σ as the numerator becomes √4, that is, double, because it is proportional to the value of the square root of the image luminance gradation value. Since the numerator becomes double and the denominator becomes quadruple, the error becomes one half.

Figure 18A:
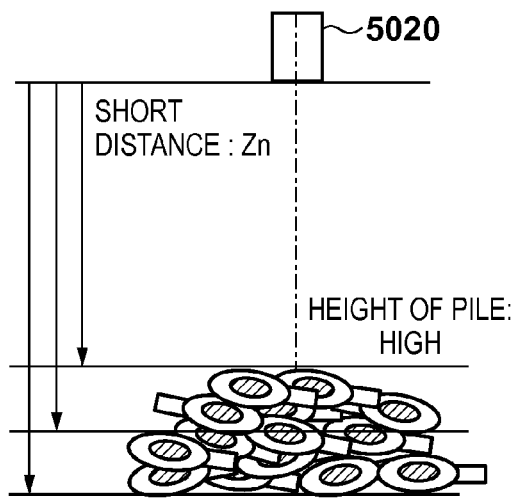
FIGS. 18A to 18C are views for explaining a change of the height of a plurality of piled parts.
Figure 18B:
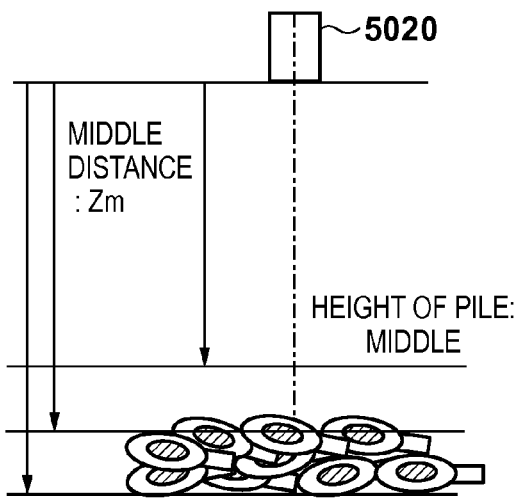
Figure 18C:
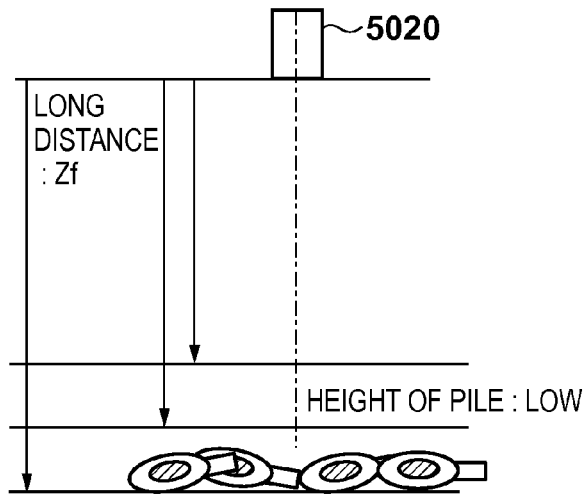

In a case in which, of a plurality of piled parts (target object 505), a part whose position and orientation have been recognized is picked, the height of the pile changes as the part is removed, as shown in FIGS. 18A to 18C. When the height of the pile is high, the distance from the image capturing unit 5020 to an image capturing target becomes short, as shown in FIG. 18A. When the height of the pile is low, the distance from the image capturing unit 5020 to an image capturing target becomes long, as shown in FIG. 18C. At this time, the luminance value of a part in an image captured by the image capturing unit 5020 decreases in proportion to the square of the distance from the image capturing unit 5020 to the image capturing target.

The relationship between a luminance value in an image captured by the image capturing unit 5020, and a distance from the image capturing unit 5020 to an image capturing target will be explained with reference to FIGS. 19A to 19C. Assume that the exposure amount of the image capturing unit 5020 has been set to be optimum at a distance Zm (middle distance) from the image capturing unit 5020 to the image capturing target, as shown in FIG. 19B. In FIG. 19B, the waveform of a full light-on pattern and the waveforms of positive and negative patterns partially exceed the saturation level, but a luminance gradation value near an intersection point position used to specify a pattern position does not exceed the saturation level. For this reason, the intersection point position can be specified, and the sub-pixel position estimation error can be reduced, because the luminance gradation value near the intersection point becomes large.

Figure 19A:
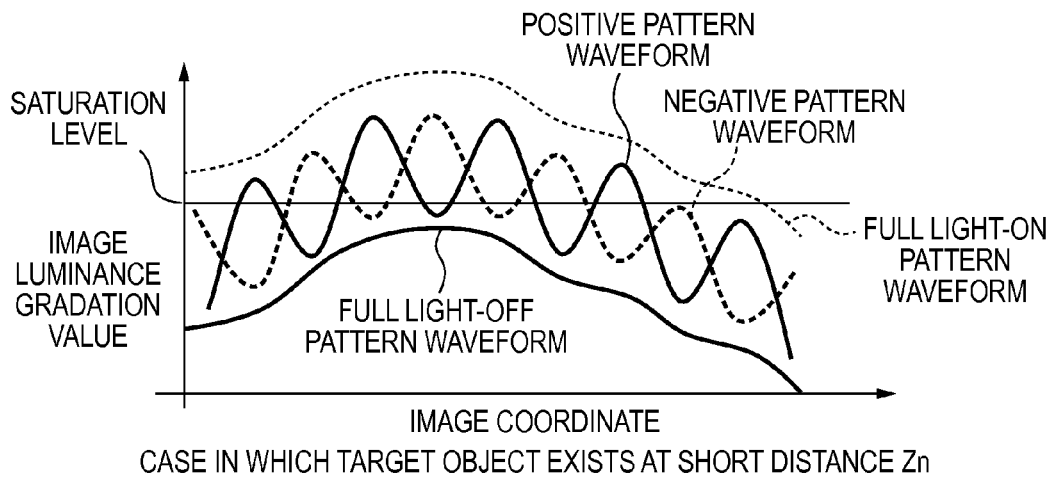
FIGS. 19A to 19C are graphs for explaining the relationship between a luminance value in a captured image and a distance to an image capturing target.
Figure 19B:
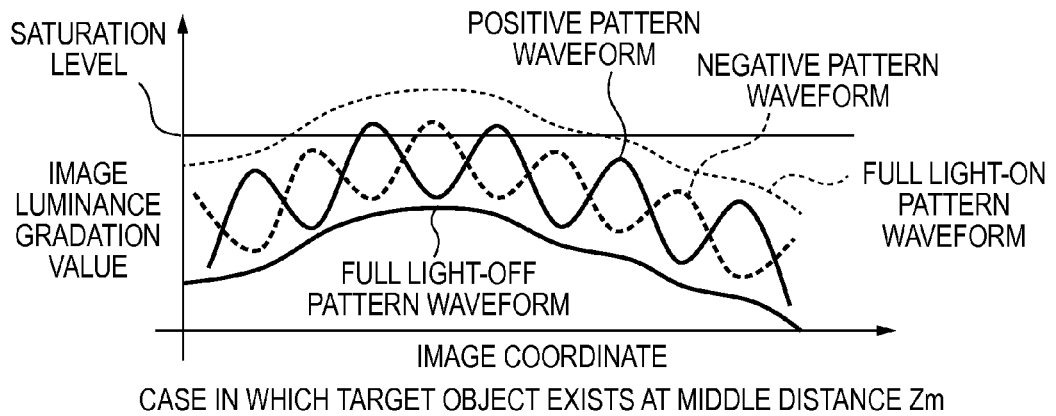

FIG. 19A shows the waveforms of luminance gradation values when the distance from the image capturing unit 5020 to an image capturing target is Zn (short distance) less than Zm. The waveforms exceed the saturation level at the center. FIG. 19A shows the waveforms exceeding the saturation level, for convenience. In practice, a waveform exceeding the saturation level is cut at the luminance gradation value of the saturation level and output. In FIG. 19A, the intersection point position is cut at the luminance gradation value of the saturation level, and cannot be specified.

Figure 19C:
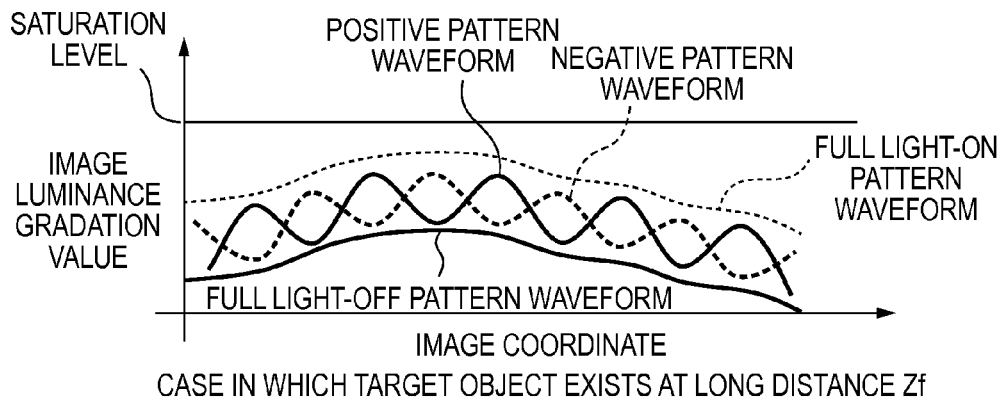

FIG. 19C shows the waveforms of luminance gradation values when the distance from the image capturing unit 5020 to an image capturing target is Zf (long distance) greater than Zm. In the state of FIG. 19C, none of the waveforms of the luminance gradation values reaches the saturation level, and the distance measurement accuracy is low.

From the above description, to reliably perform distance measurement at high accuracy at a short distance, a middle distance, and a long distance, "parameters for controlling the bright and dark portions of an image to be captured a next time by the image capturing unit 5020" need to be adjusted in accordance with the distance.

Next, processing to be performed by the image processing unit 5040 in order to adjust the exposure amount (exposure time) of the image capturing unit 5020 will be explained with reference to FIG. 20, showing the flowchart of this processing. The processing complying with the flowchart of FIG. 20 includes processing (step S50100) of obtaining an exposure amount serving as a reference (reference exposure amount), and a distance (reference distance) measured using an image captured in the reference exposure amount, and processing (step S50110) of adjusting the exposure amount.

First, the processing in step S50100 will be explained. In step S50101, the captured image exposure amount control unit 5045 controls the exposure amount of the image capturing unit 5020 in accordance with the currently set parameter of the exposure amount. The pattern light brightness control unit 5044 controls the brightness of pattern light projected from the projection unit 5030 in accordance with the currently set parameter of the brightness of pattern light.

In step S50101, the projection unit 5030 sequentially selects one by one a plurality of projection patterns described above, and irradiates the target object 505 with the selected projection pattern. The image capturing unit 5020 captures the target object 505. The types of projection patterns are four: a full light-on pattern, a full light-off pattern, a positive pattern (in FIGS. 2A to 2G, the four positive patterns in FIGS. 2C to 2F), and a negative pattern (in FIGS. 2A to 2G, the negative pattern in FIG. 2G). The four-bit space encoding method uses a four-bit positive pattern as the positive pattern, and a four-bit negative pattern as the negative pattern. The image capturing unit 5020 captures the target object 505 every time the selected pattern light is projected.

In step S50102, the adjustment unit 5041 performs bright/dark portion determination using the image captured by the image capturing unit 5020. Details of the processing in step S50102 are the same as those of the processing complying with the flowchart of FIG. 9 (the adjustment unit 5041 executes the processing complying with the flowchart of FIG. 9 instead of the bright/dark portion determination unit 42), so a description thereof will not be repeated.

Figure 9:
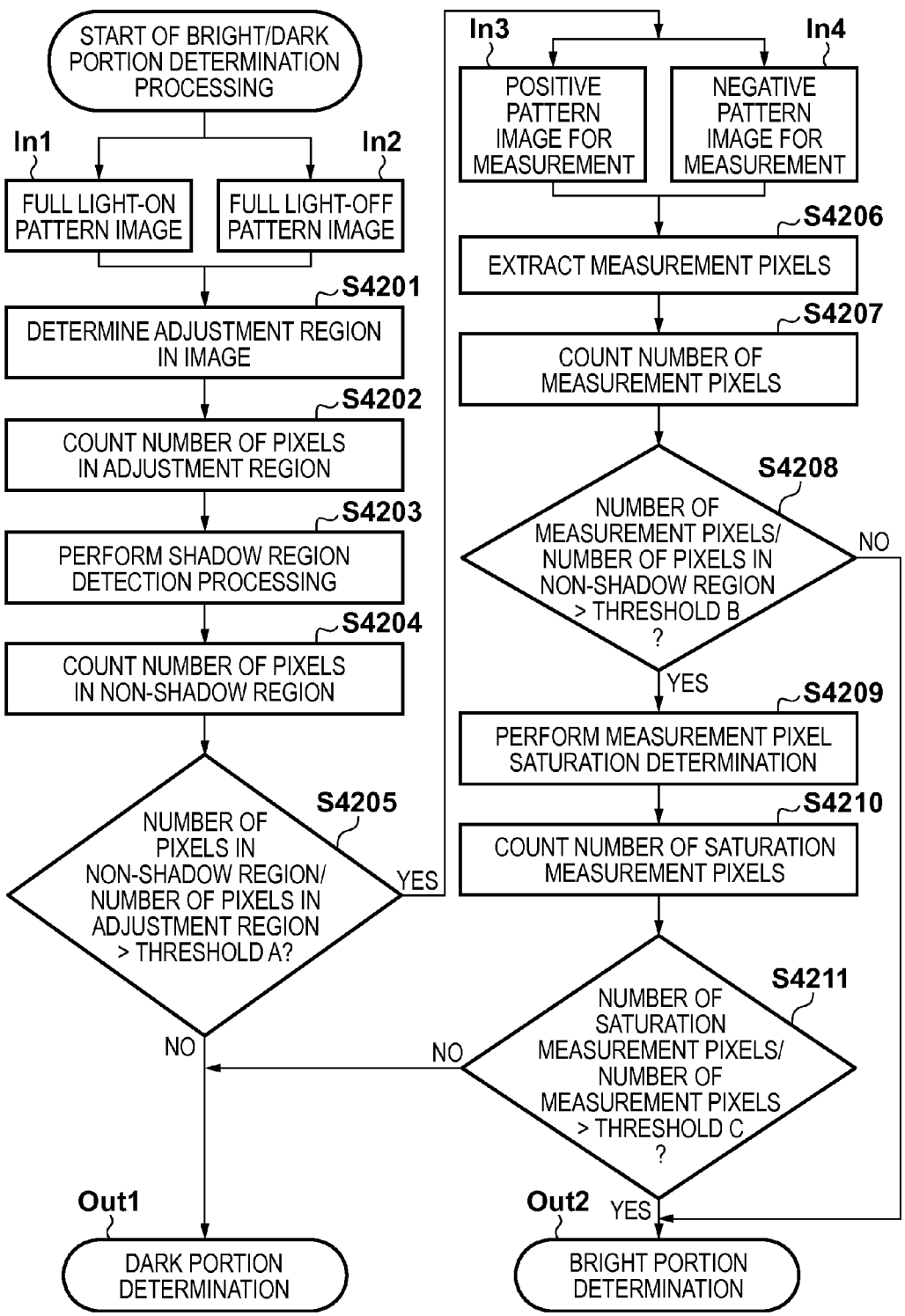
FIG. 9 is a flowchart showing details of processing in step S4105.

Note that the bright/dark portion determination processing for a captured image that is performed in step S50102 is not limited to the processing complying with the flowchart of FIG. 9, but may adopt another method.

In step S50103, if the determination result in step S50102 is "bright portion", the adjustment unit 5041 adjusts the parameter of the image capturing unit 5020 in order to adjust the current exposure amount of the image capturing unit 5020 to be lesser (in order to adjust the current exposure time to be shorter). If the determination result in step S50102 is "dark portion", the adjustment unit 5041 adjusts the parameter of the image capturing unit 5020 in order to adjust the current exposure amount of the image capturing unit 5020 to be greater (in order to adjust the current exposure time to be longer). The exposure time can be adjusted by, for example, binary search. The adjustment unit 5041 sets, in the captured image exposure amount control unit 5045, the adjusted parameter of the image capturing unit 5020. The captured image exposure amount control unit 5045 controls the image capturing unit 5020 in accordance with the adjusted parameter from the next time.

After that, the process returns to step S50101. In step S50101, image capturing based on the exposure time adjusted in step S50103 is performed. In this way, the processes in steps S50101 to S50103 are repetitively performed a plurality of times. In step S50104, the adjustment unit 5041 obtains, as a reference exposure amount Exb, an exposure amount (in this case, exposure time) obtained as a result of the repetition.

In step S50105, the captured image exposure amount control unit 5045 controls the exposure amount of the image capturing unit 5020 in accordance with the reference exposure amount Exb. The pattern light brightness control unit 5044 controls the brightness of pattern light projected from the projection unit 5030 in accordance with the currently set parameter of the brightness of pattern light. The projection unit 5030 sequentially selects, one by one, a plurality of projection patterns described above, and irradiates the target object 505 with the selected projection pattern. The image capturing unit 5020 captures the target object 505. By performing the above-described processing using each image captured by the image capturing unit 5020, the distance calculation unit 5043 measures distances to respective target objects in the captured image.

In step S50106, the rough distance calculation unit 5042 obtains a reference distance (reference rough distance) Zb serving as the typical distance of the distances to the respective target objects in the captured image. Processing for obtaining the reference distance Zb from distances to respective target objects in a captured image will be explained with reference to FIGS. 21A and 21B. FIG. 21A shows an example of the reference distance Zb when the height of the pile is high. FIG. 21B shows an example of the reference distance Zb when the height of the pile is middle. For example, the average distance of distances to respective target objects in a captured image may be set as the reference distance, or a maximum value, a minimum value, a median value, or the like, may be employed as the reference distance.

Next, the processing in step S50110 will be explained. In step S50111, the captured image exposure amount control unit 5045 controls the exposure amount of the image capturing unit 5020 in accordance with the currently set exposure amount (in step S50111 for the first time, the reference exposure amount Exb, and in step S50111 for the second and subsequent times, an exposure amount Ext adjusted in previous step S50116). The pattern light brightness control unit 5044 controls the brightness of pattern light projected from the projection unit 5030 in accordance with the currently set parameter of the brightness of pattern light. The projection unit 5030 sequentially selects, one by one, a plurality of projection patterns described above, and irradiates the target object 505 with the selected projection pattern. The image capturing unit 5020 captures the target object 505.

By performing the above-described processing using each image captured by the image capturing unit 5020, the distance calculation unit 5043 measures distances to respective target objects in the captured image in step S50112.

In step S50113, the rough distance calculation unit 5042 performs the same processing as that in step S50106 described above, thereby obtaining a typical distance (rough distance) Zt of the distances to the respective target objects in the captured image.

In step S50114, the adjustment unit 5041 obtains a currently set adjustment amount (optical correction amount) Czo of the exposure amount by using the reference distance Zb and distance Zt. The optical correction amount Czo is calculated based on an optical characteristic in which the luminance value in an image becomes dark in proportion to the square of the distance. More specifically, the optical correction amount Czo is obtained by solving:

$$Czo=(Zt/Zb)^2 \qquad (3)$$

In step S50115, the adjustment unit 5041 adjusts the reference exposure amount Exb by using the optical correction amount Czo. For example, the reference exposure amount Exb is adjusted according to:

$$Czo \times Exb \to Ext. \qquad (4)$$

In step S50116, the adjustment unit 5041 sets, in the captured image exposure amount control unit 5045, the exposure amount Ext adjusted in step S50115. The process then returns to step S50111 to repeat the subsequent processes.

As described above, according to the fourth embodiment, the exposure amount is set to be small in a case in which the height of the pile is high, and to be large in a case in which the height of the pile is low. An appropriate exposure amount can be set in accordance with the height of the pile. That is, the luminance value of a captured image can be kept almost constant with respect to a change of the height of the pile.

In the fourth embodiment, distance measurement with respect to the target object 505 is performed based on the space encoding method. However, distance measurement with respect to the target object 505 may be executed by another method. For example, a distance measurement method based on various pattern projections, such as a light-section method and phase shift method, may be adopted.

Fifth Embodiment

In the fifth embodiment, the exposure amount is adjusted in consideration of, not only the optical correction amount, but also, a triangulation error. A difference from the fourth embodiment will be mainly explained, and the remaining part is the same as that in the fourth embodiment, unless otherwise specified.

Processing to be performed by an image processing unit 5040 in order to adjust the exposure amount of an image capturing unit 5020 will be explained with reference to FIG. 22 showing the flowchart of this processing. In the flowchart of FIG. 22, the same step numbers as those in FIG. 20 denote the same processing steps, and a description of these processing steps will not be repeated.

Figure 23:
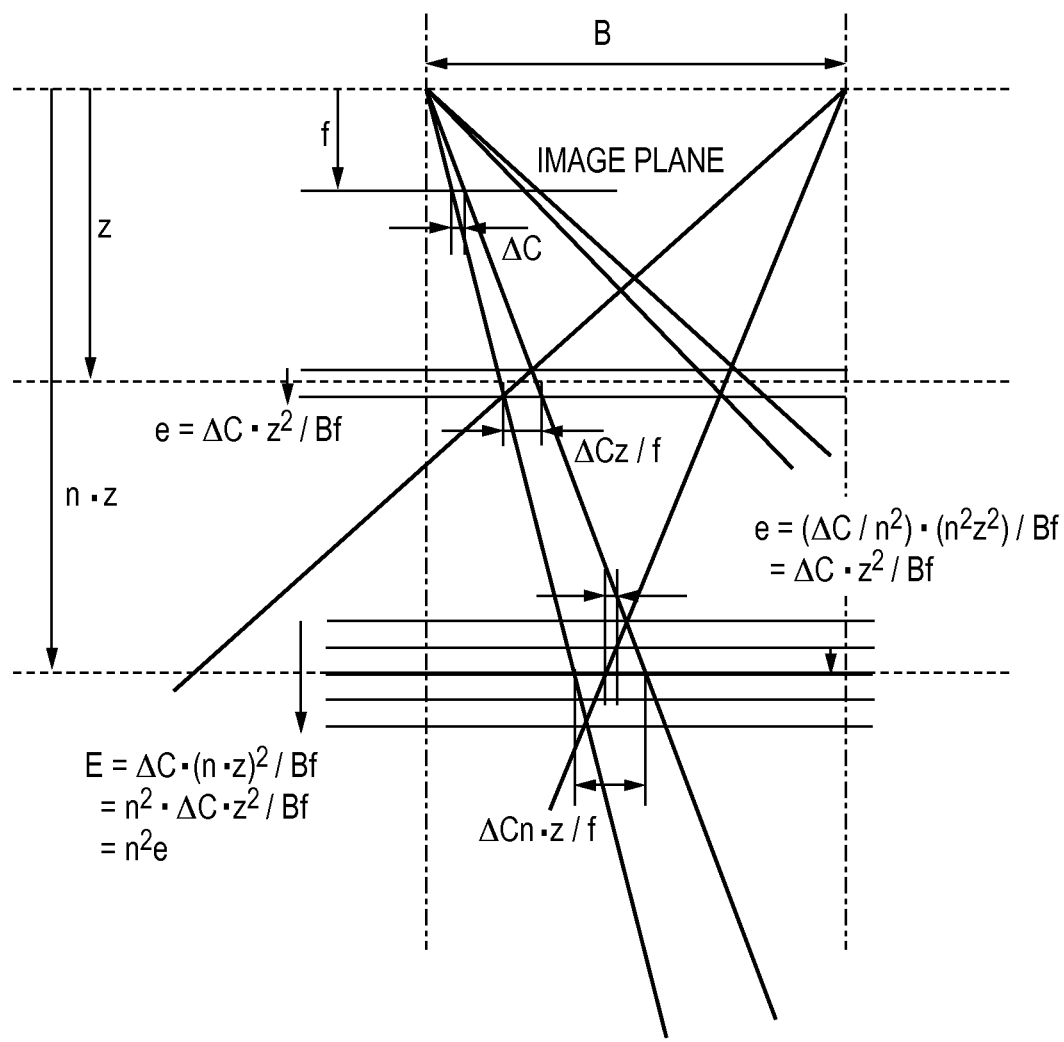
FIG. 23 is a view for explaining a triangulation correction amount Czt.

In step S50215, an adjustment unit 5041 obtains an adjustment amount (triangulation correction amount) Czt of the triangulation error by using a reference distance Zb and distance Zt. The correction amount is calculated based on a characteristic in which the triangulation error increases in proportion to the square of the distance. As the distance is multiplied by n, the distance measurement error is multiplied by $n^2$, as shown in FIG. 23. To keep the measurement error constant, a sub-pixel position estimation error ΔC needs to be $1/n^2$. To set the sub-pixel estimation error ΔC to be $1/n^2$, the brightness of pattern light or the exposure amount needs to be multiplied by $n^4$, as described above. Czt can be obtained according to:

$$Czt=(Zt/Zb)^4 \tag{5}$$

In step S50216, the adjustment unit 5041 adjusts the reference exposure amount Exb by using the optical correction amount Czo and triangulation correction amount Czt. For example, the reference exposure amount Exb is adjusted according to:

$$Czo \times Czt \times Exb \rightarrow Ext. \tag{6}$$

In step S50217, the adjustment unit 5041 sets, in a captured image exposure amount control unit 5045, the exposure amount Ext adjusted in step S50216. The process then returns to step S50111 to repeat the subsequent processes.

Note that, when the ratio of the reference distance Zb and distance Zt is high, if the exposure amount Ext=the exposure time and the exposure time is multiplied by (Czo×Czt), a captured image may be saturated. In this case, the exposure time out of Ext is multiplied by the optical correction amount Czo, and the number of images to be captured is multiplied by Czt. This can reduce the measurement error without saturating a captured image.

As described above, according to the fifth embodiment, the exposure amount is set to be small in a case in which the height of the pile is high, and to be large in a case in which the height of the pile is low. An appropriate exposure amount can be set in accordance with the height of the pile. That is, the luminance value of a captured image can be kept almost constant with respect to a change of the height of the pile. Since even the triangulation error is taken into account, the brightness of a captured image and the measurement error can be kept almost constant with respect to a change of the height of the pile.

Sixth Embodiment

Figure 24:
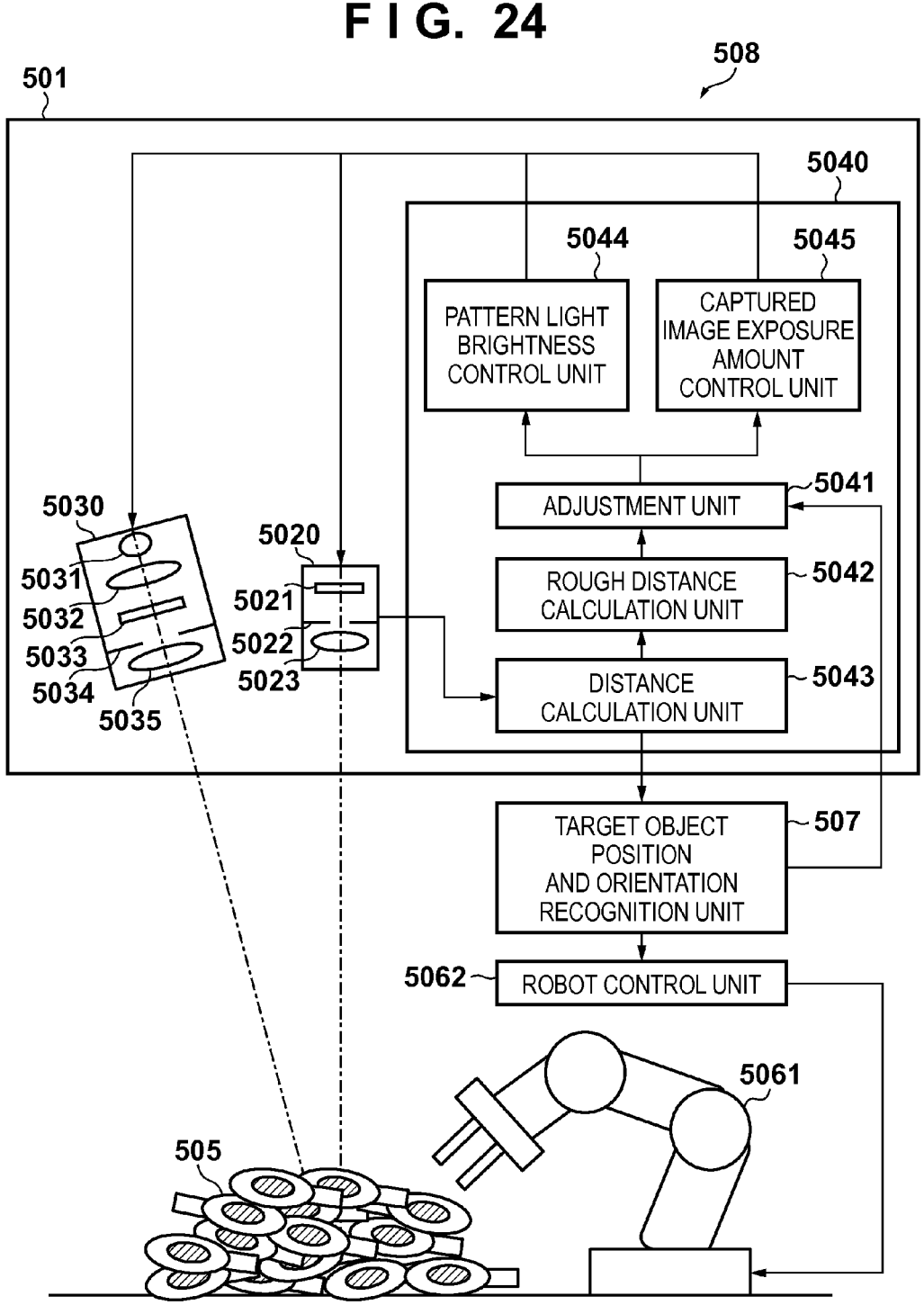
FIG. 24 is a block diagram showing an example of the functional arrangement of the target object picking system 508.

An example of the functional arrangement of a target object picking system 508 according to the sixth embodiment will be described with reference to the block diagram of FIG. 24. In FIG. 24, the same reference numerals as those in FIG. 17 denote the same functional units, and a description regarding these functional units will not be repeated. The arrangement shown in FIG. 24 is different from the arrangement of FIG. 17 in that a position and orientation recognized by a target object position and orientation recognition unit 507 are supplied, not only to a robot control unit 5062, but also, to an adjustment unit 5041.

The sixth embodiment considers, not only a change of the light amount upon a change of the distance to a target object, but also, a change of the light amount caused by light falloff at edges. For this purpose, the adjustment unit 5041 needs to grasp the position of a target object in a captured image (in other words, the angle of view with respect to a range in which the target object exists). To grasp the position of a target object in a captured image, an output result from the target object position and orientation recognition unit 507 is used.

Figure 25:
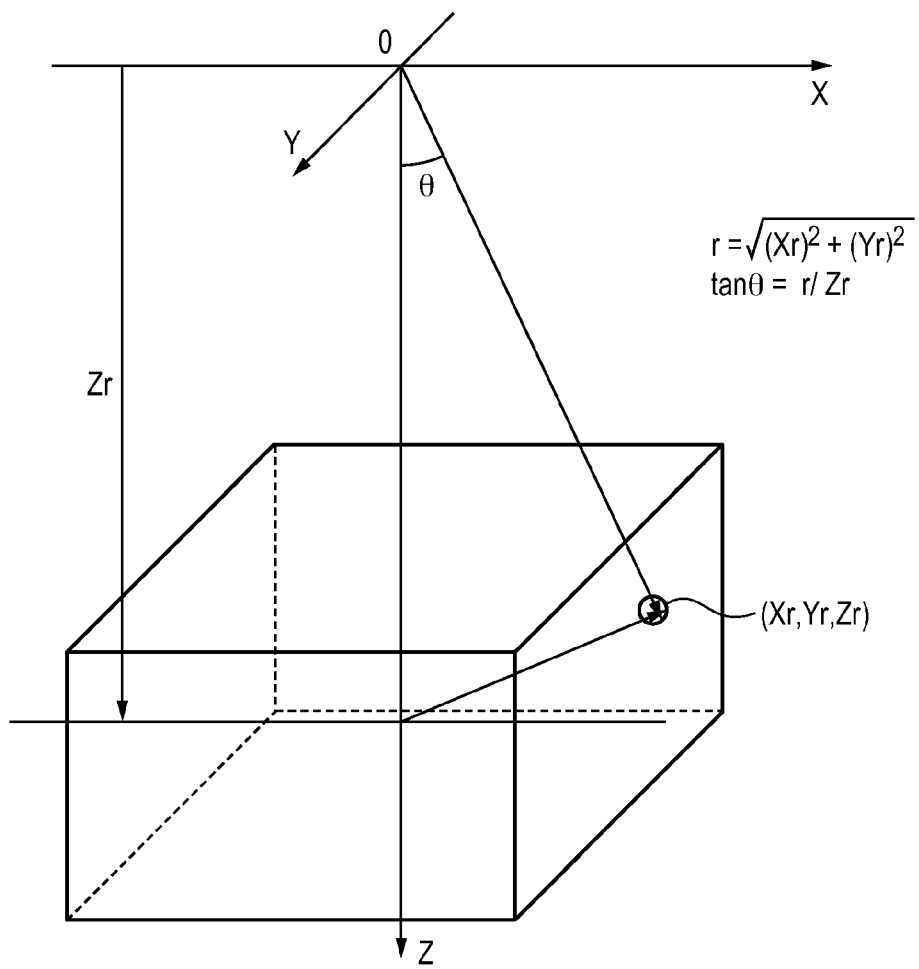
FIG. 25 is a view for explaining the relationship between the position and orientation of a target object, and the angle θ of view with respect to the target object.

A difference from the fourth embodiment will be mainly explained, and the remaining part is the same as that in the fourth embodiment, unless otherwise specified. First, the relationship between the position and orientation of a target object, and the angle θ of view with respect to the target object will be described with reference to FIG. 25. Assume that the position of the target object that is output from the target object position and orientation recognition unit 507 is (Xr, Yr, Zr). A coordinate origin O is set to coincide with the origin of a coordinate system handled by an image processing unit 5040. Letting r be the distance from the Z-axis to the target object in an X-Y plane at a depth Zr, r is calculated by:

$$r=\sqrt{(Xr^2+Yr^2)}. \tag{7}$$

The angle θ of view can be calculated using r and Zr:

$$\theta=\tan^{-1}(r/Zr). \tag{8}$$

That is, the relationship between the position (Xr, Yr, Zr) of the target object and the angle θ of view can be grasped from equation (8).

Figure 26:
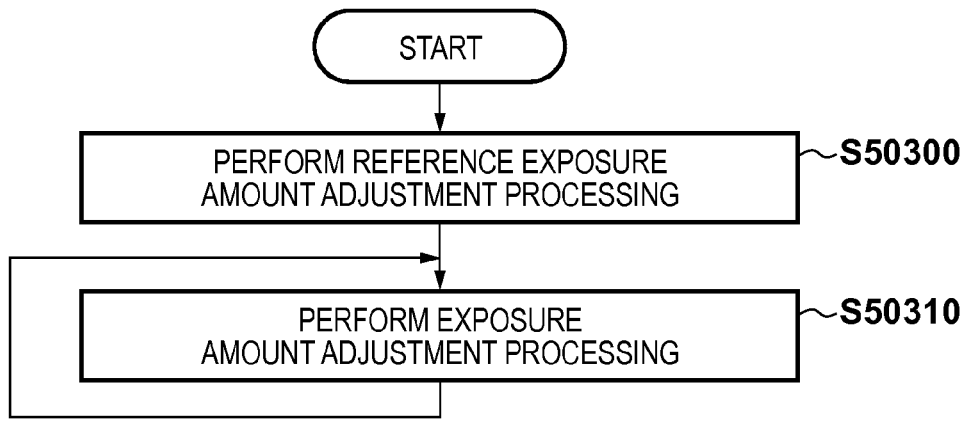
FIG. 26 is a flowchart showing processing to be performed by the image processing unit 5040.

Next, processing to be performed by the image processing unit 5040 in order to adjust the exposure amount of an image capturing unit 5020 will be explained with reference to FIG. 26 showing the flowchart of this processing (processing to be executed by the target object position and orientation recognition unit 507 is also partially included). The processing complying with the flowchart of FIG. 26 includes processing (step S50300) of obtaining a reference exposure amount Exb, reference distance Zb, and reference plane internal position θb, and processing (step S50310) of adjusting the exposure amount for each target object.

Figure 27A:
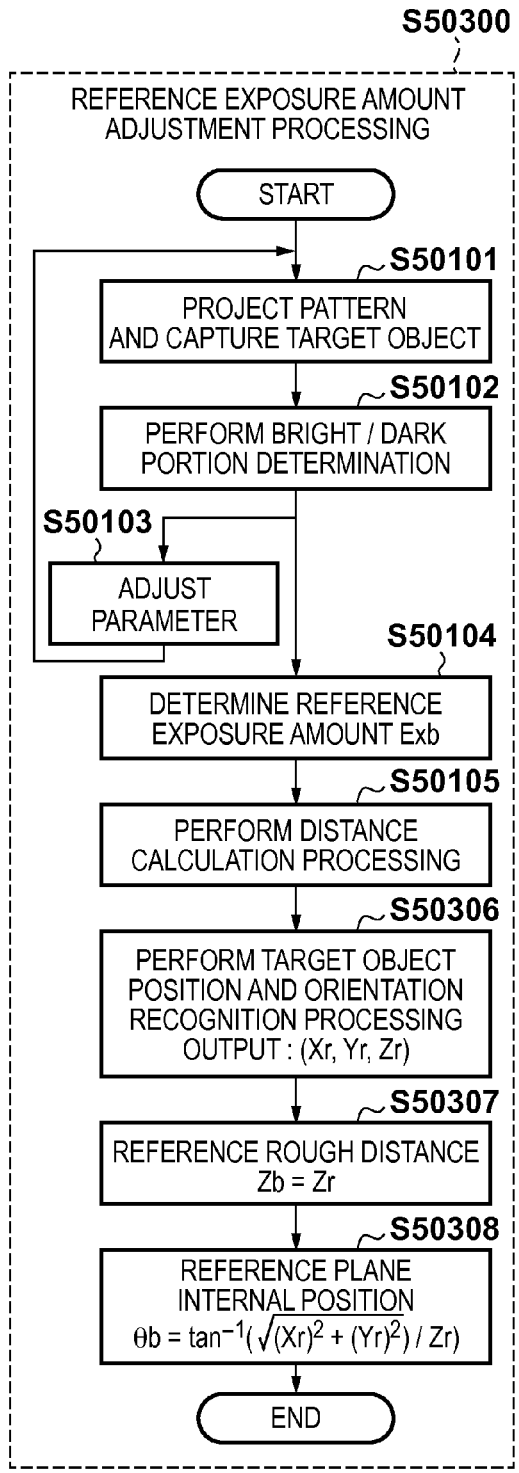
FIGS. 27A and 27B are flowcharts showing details of processing in step S50300.
Figure 27B:
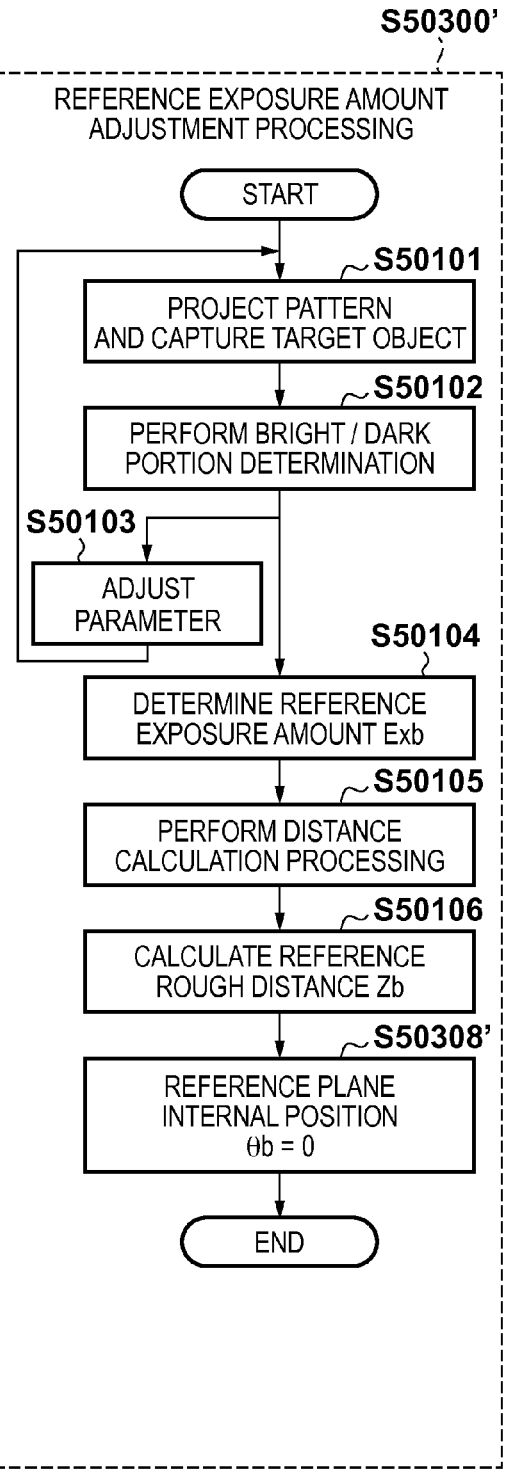

First, details of the processing in step S50300 will be explained with reference to the flowcharts of FIGS. 27A and 27B. Both the flowchart shown in FIG. 27A and the flowchart shown in FIG. 27B are the flowcharts of processes applicable to step S50300. In FIGS. 27A and 27B, the same step numbers as those shown in FIG. 20 denote the same processing steps, and a description of these processing steps will not be repeated.

First, processing complying with the flowchart of FIG. 27A will be explained.

In step S50306, a captured image exposure amount control unit 5045 controls the exposure amount of the image capturing unit 5020 in accordance with the reference exposure amount Exb. A pattern light brightness control unit 5044 controls the brightness of pattern light projected from a projection unit 5030 in accordance with the currently set parameter of the brightness of pattern light. The projection unit 5030 sequentially selects, one by one, a plurality of projection patterns described above, and irradiates a target object 505 with the selected projection pattern. The image capturing unit 5020 captures the target object 505. By performing the above-described processing using each image captured by the image capturing unit 5020, a distance calculation unit 5043 measures distances to respective target objects in the captured image.

The target object position and orientation recognition unit 507 recognizes the positions and orientations of the target objects by using the distances to the respective target objects that have been calculated by the distance calculation unit 5043. The adjustment unit 5041 acquires the positions (Xr, Yr, Zr) of the respective target objects recognized by the target object position and orientation recognition unit 507.

In step S50307, the adjustment unit 5041 sets the position Zr of the target object as the reference distance Zb for the respective target objects in the captured image.

In step S50308, the adjustment unit 5041 calculates the reference plane internal position θb for the respective target objects in the captured image based on equations (7) and (8) by:

$$\theta b = \tan^{-1}(\sqrt{(Xr^2+Yr^2)}/Zr). \quad (9)$$

Next, processing complying with the flowchart of FIG. 27B will be explained. In FIG. 27B, the rough distance of the entire pile is the reference rough distance Zb, and the center (position at which the angle of view is 0°) of a captured image is the reference angle θb of view. In step S50308', the adjustment unit 5041 sets, to zero, the reference plane internal position θb common to respective target objects in a captured image.

Figure 28:
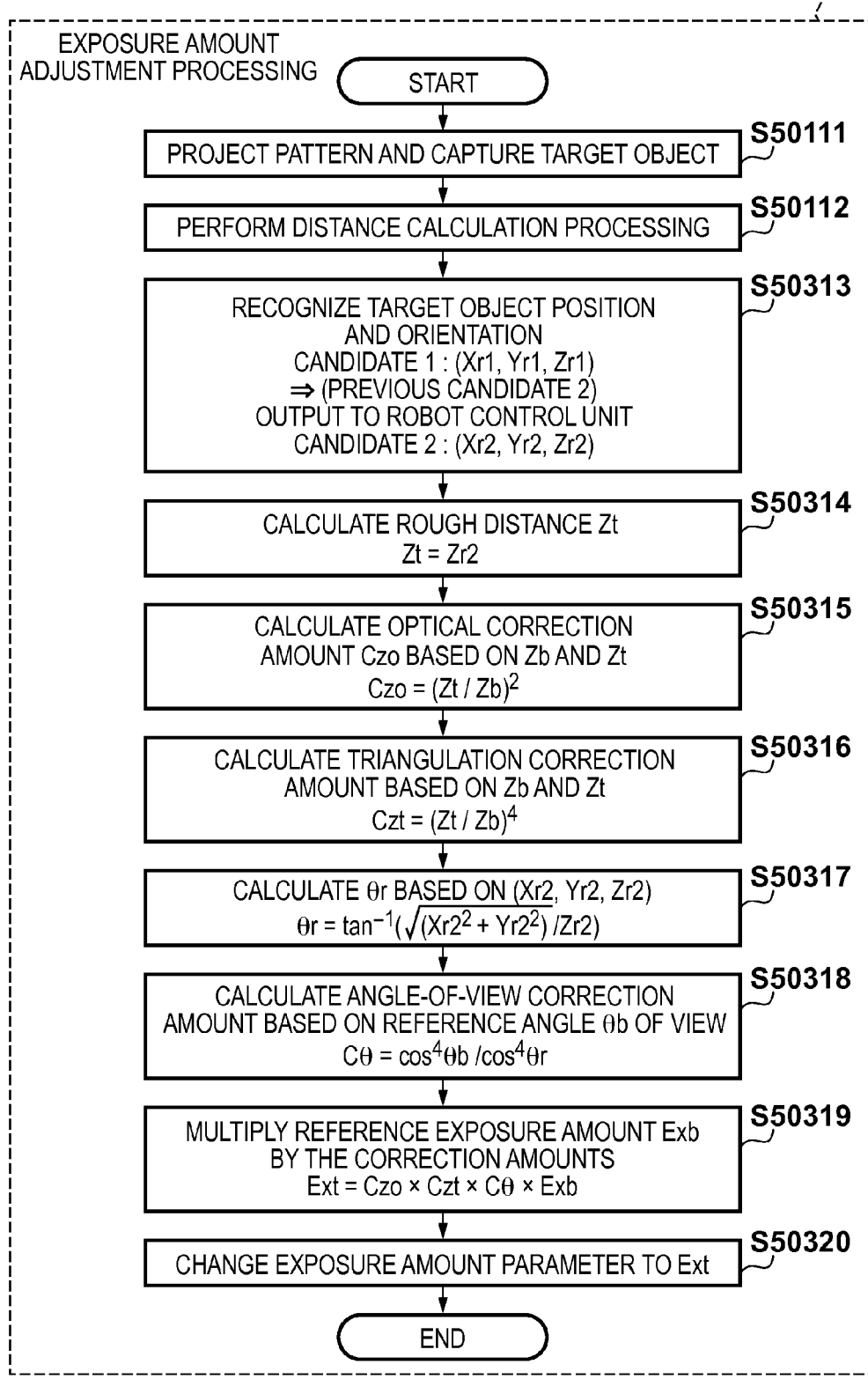
FIG. 28 is a flowchart showing details of processing in step S50310.

Next, details of the processing in step S50310 will be described with reference to FIG. 28 showing the flowchart of this processing. In FIG. 28, the same step numbers as those shown in FIG. 20 denote the same processing steps, and a description regarding these processing steps will not be repeated.

In step S50313, the target object position and orientation recognition unit 507 recognizes the position and orientation of each target object by using a distance calculated by the distance calculation unit 5043 for the target object in an image captured in step S50111. At this time, the target object position and orientation recognition unit 507 sends, to the robot control unit 5062, the position of a target object (candidate 1) that has been output to the adjustment unit 5041 previously. Also, the target object position and orientation recognition unit 507 outputs, to the adjustment unit 5041, the position of one target object (candidate 2) that has not been output yet. In addition to the position, the orientation may be output to the robot control unit 5062.

In the first output by the target object position and orientation recognition unit 507, there is no target object corresponding to candidate 1. Thus, a target object having a smallest position Zr out of the positions of respective recognized target objects is set as candidate 1.

For example, assume that the target object position and orientation recognition unit 507 recognizes the position and orientation of target object 1, the position and orientation of target object 2, the position and orientation of target object 3, and the position and orientation of target object 4. Also, assume that position Zr of target object 3 is smallest among positions Zr of target objects 1 to 4. At the first time, the target object position and orientation recognition unit 507 outputs the position (may also output the orientation) of target object 3 serving as candidate 1 to the robot control unit 5062, and outputs the position of target object 1 serving as candidate 2 to the adjustment unit 5041. At the second time, the target object position and orientation recognition unit 507 outputs the position (may also output the orientation) of target object 1 serving as candidate 1 to the robot control unit 5062, and outputs the position of target object 2 serving as candidate 2 to the adjustment unit 5041. At the third time, the target object position and orientation recognition unit 507 outputs the position (may also output the orientation) of target object 2 serving as candidate 1 to the robot control unit 5062, and outputs the position of target object 3 serving as candidate 2 to the adjustment unit 5041. At the fourth time, the target object position and orientation recognition unit 507 outputs the position (may also output the orientation) of target object 3 serving as candidate 1 to the robot control unit 5062, and outputs the position of target object 4 serving as candidate 2 to the adjustment unit 5041. At the fifth time, the target object position and orientation recognition unit 507 outputs the position of target object 4 to the robot control unit 5062.

In this manner, the position of the second candidate is output to the adjustment unit 5041. A target object that was previously the second candidate is set as the first candidate this time. Then, the position of the first candidate time this is output (the orientation may also be output) to the robot control unit 5062.

In step S50314, upon receiving the position (Xr2, Yr2, Zr2) of the second candidate, the adjustment unit 5041 sets Zr2 in the rough distance Zt.

In step S50315, the adjustment unit 5041 obtains an optical correction amount Czo by solving the above-described equation (3) using the reference distance Zb and rough distance Zt.

In step S50316, the adjustment unit 5041 obtains a triangulation correction amount Czt by solving the above-described equation (5) using the reference distance Zb and rough distance Zt.

In step S50317, the adjustment unit 5041 obtains an angle θr of view with respect to the second candidate by solving the above-described equation (9) using the position (Xr2, Yr2, Zr2) of the second candidate.

In step S50319, the adjustment unit 5041 obtains an angle-of-view correction amount Cθ by solving equation (10) using the reference plane internal position θb calculated in step S50300 (or step S50300') described above, and the angle θr of view obtained in step S50317:

$$C\theta = \cos^4 \theta b / \cos^4 \theta r. \quad (10)$$

It is known that light falloff occurs based on a so-called cosine fourth-power law. According to this law, light falloff occurs in proportion to the fourth power of the cosine.

In step S50319, the adjustment unit 5041 adjusts the reference exposure amount Exb by solving expression (11), and obtains the exposure amount Ext for the second candidate as the result of adjustment:

$$Czo \times Czt \times C\theta \times Exb \rightarrow Ext. \quad (11)$$

That is, every time the adjustment unit 5041 receives the position of the second candidate, it calculates Ext for the second candidate. According to the embodiment, even if the position of a target object to be recognized in the frame changes in addition to the height of the pile, an appropriate exposure amount can be set. The exposure amount is set to be small near the center of the frame at which the angle of view is small, and to be large at the edge of the frame at which the angle of view is large.

The embodiment has described an example in which the position of a target object in a captured image is grasped based on the position and orientation recognition result of the target object. However, the position and orientation recognition result of a target object need not always be used. For example, an area in which a target object is captured in a captured image is divided into a plurality of areas, and a rough distance is calculated for each divided area. The center position of an area having a smallest rough distance among the divided areas is regarded as a position at which the target object exists.

In step S50318 described above, light falloff at edges depending on the position (angle of view) in a captured image is formulated on the assumption that it is based on the cosine fourth-power law. However, the present invention is not limited to this. When the characteristic of the optical system is not based on the cosine fourth-power law, a proper equation can be used in accordance with this characteristic. Alternatively, it is also possible to use a method of tabling the relationship between the angle of view and the brightness based on measured data without using a polynomial, and refer to the value of a corresponding angle of view in accordance with the position of a target object in a captured image.

Seventh Embodiment

Each functional unit constituting an image processing unit 5040 may be constituted by hardware or software (computer program). In this case, an apparatus that executes the computer program upon installing the computer program is applicable to the image processing unit 5040. As an example of the hardware arrangement of the apparatus applicable to the image processing unit 5040, for example, the arrangement shown in the block diagram of FIG. 16 is applicable.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A processing apparatus comprising:
an acquisition unit configured to acquire a single captured image obtained by capturing, by an image capturing unit, target objects to which a projection unit has emitted pattern light;
a derivation unit configured to derive, using the single captured image, distances from the image capturing unit to the target objects included in the single captured image; and
an adjustment unit configured to obtain, using the derived distances, an adjustment amount of at least one of a brightness of the pattern light emitted from the projection unit and an exposure amount of the image capturing unit, and to adjust, in accordance with the obtained adjustment amount, at least one of a first parameter for controlling the brightness of the pattern light emitted from the projection unit, and a second parameter for controlling the exposure amount of the image capturing unit.

2. The apparatus according to claim 1, further comprising:
a first unit configured to adjust at least one of the first parameter and the second parameter in accordance with a luminance of the captured image; and
a second unit configured to acquire, after adjustment by the first unit, a captured image obtained by capturing, by the image capturing unit in which the second parameter has been set, a target object to which pattern light has been emitted by the projection unit in which the first parameter has been set, and to calculate, as a reference distance, a distance from the image capturing unit to the target object by using the acquired captured image,
wherein the adjustment unit adjusts at least one of the first parameter and the second parameter by using a ratio of the distance derived by the derivation unit to the reference distance.

3. The apparatus according to claim 2, wherein the adjustment unit adjusts an adjustment target out of the first parameter and the second parameter by multiplying the adjustment target by a value obtained by squaring the ratio.

4. The apparatus according to claim 2, wherein the adjustment unit adjusts the second parameter by multiplying, by a value obtained by squaring the ratio, a parameter included in the second parameter to control an exposure time, and multiplying, by a value obtained by raising the ratio to the fourth power, a parameter included in the second parameter to control an image capturing count.

5. The apparatus according to claim 1, wherein the adjustment unit adjusts at least one of the first parameter and the second parameter in accordance with the distance and a position of the target object.

6. The apparatus according to claim 2, wherein
(i) the first unit obtains an intersection point between a luminance value waveform formed from luminance values of respective pixels constituting a first captured image of the target object to which first pattern light has been emitted, and a luminance value waveform formed from luminance values of respective pixels constituting a second captured image of the target object to which second pattern light obtained by inverting bright and dark portions in the first pattern light has been emitted, and
(ii) the first unit adjusts at least one of the first parameter and the second parameter in accordance with the number of intersection points.

7. The apparatus according to claim 6, wherein, when a ratio of the number of intersection points to the number of pixels in a region specified as a non-shadow region in the first captured image or the second captured image is not higher than a threshold, the first unit adjusts the first parameter to make the pattern light darker, or adjusts the second parameter to decrease the exposure amount.

8. The apparatus according to claim 6, wherein, when a ratio of the number of intersection points to the number of pixels in a region specified as a non-shadow region in the first captured image or the second captured image is not higher than a threshold, the first unit adjusts the first parameter to make the pattern light darker, and adjusts the second parameter to decrease the exposure amount.

9. The apparatus according to claim 6, wherein
(i) when a ratio of the number of intersection points to the number of pixels in a region specified as a non-shadow region in the first captured image or the second captured image has exceeded a threshold, the first unit obtains, as a second ratio, a ratio, to the number of intersection points, of the number of intersection points obtained by referring to pixels whose pixel values are saturated, and
(ii) when the second ratio has exceeded a threshold, the first unit adjusts the first parameter to make the pattern light darker, or adjusts the second parameter to decrease the exposure amount.

10. The apparatus according to claim 6, wherein
(i) when a ratio of the number of intersection points to the number of pixels in a region specified as a non-shadow region in the first captured image or the second captured image has exceeded a threshold, the first unit obtains, as a second ratio, a ratio, to the number of intersection points, of the number of intersection points obtained by referring to pixels whose pixel values are saturated, and
(ii) when the second ratio has exceeded a threshold, the first unit adjusts the first parameter to make the pattern light darker, and adjusts the second parameter to decrease the exposure amount.

11. The apparatus according to claim 6, wherein
(i) when a ratio of the number of intersection points to the number of pixels in a region specified as a non-shadow region in the first captured image or the second captured image has exceeded a threshold, the first unit obtains, as a second ratio, a ratio, to the number of intersection points, of the number of intersection points obtained by referring to pixels whose pixel values are saturated, and
(ii) when the second ratio is not higher than a threshold, the first unit adjusts the first parameter to make the pattern light brighter, or adjusts the second parameter to increase the exposure amount.

12. The apparatus according to claim 6, wherein
(i) when a ratio of the number of intersection points to the number of pixels in a region specified as a non-shadow region in the first captured image or the second captured image has exceeded a threshold, the first unit obtains, as a second ratio, a ratio, to the number of intersection points, of the number of intersection points obtained by referring to pixels whose pixel values are saturated, and
(ii) when the second ratio is not higher than a threshold, the first unit adjusts the first parameter to make the pattern light brighter, and adjusts the second parameter to increase the exposure amount.

13. A processing method to be performed by an image processing apparatus, the method comprising:
acquiring a single captured image obtained by capturing, by an image capturing unit, target objects to which a projection unit has emitted pattern light;
deriving distances, using the single captured image, from the image capturing unit to the target objects included in the single captured image; and
obtaining, using the derived distances, an adjustment amount of at least one of a brightness of the pattern light emitted from the projection unit and an exposure amount of the image capturing unit, and adjusting, in accordance with the obtained adjustment amount, at least one of a first parameter for controlling the brightness of the pattern light emitted from the projection unit, and a second parameter for controlling the exposure amount of the image capturing unit.

14. A non-transitory computer-readable storage medium storing a computer program for causing a computer to function as:
an acquisition unit configured to acquire a single captured image obtained by capturing, by an image capturing unit, target objects to which a projection unit has emitted pattern light;
a derivation unit configured to derive, using the single captured image, distances from the image capturing unit to the target objects included in the single captured image; and
an adjustment unit configured to obtain, using the derived distances, an adjustment amount of at least one of a brightness of the pattern light emitted from the projection unit and an exposure amount of the image capturing unit, and to adjust, in accordance with the obtained adjustment amount, at least one of a first parameter for controlling the brightness of the pattern light emitted from the projection unit, and a second parameter for controlling the exposure amount of the image capturing unit.

15. A measurement apparatus comprising:
(a) a projection unit configured to emit pattern light to target objects;

(b) an image capturing unit configured to capture the target objects to which the projection unit has emitted the pattern light; and (c) a processing apparatus comprising:
  (i) an acquisition unit configured to acquire a single captured image of the target objects captured by the image capturing unit;
  (ii) a derivation unit configured to derive, using the single captured image, distances from the image capturing unit to the target objects included in the single captured image; and
  (iii) an adjustment unit configured to obtain, using the derived distances, an adjustment amount of at least one of a brightness of the pattern light emitted from the projection unit and an exposure amount of the image capturing unit, and to adjust, in accordance with the obtained adjustment amount, at least one of a first parameter for controlling the brightness of the pattern light emitted from the projection unit and a second parameter for controlling the exposure amount of the image capturing unit.

16. A system comprising:
a measurement apparatus comprising:
  (a) a projection unit configured to emit pattern light to target objects;
  (b) an image capturing unit configured to capture the target objects to which the projection unit has emitted the pattern light; and
  (c) a processing apparatus comprising:
    (i) an acquisition unit configured to acquire a single captured image of the target objects captured by the image capturing unit;
    (ii) a derivation unit configured to derive, using the single captured image, distances from the image capturing unit to the target objects included in the single captured image; and
    (iii) an adjustment unit configured to obtain, using the derived distances, an adjustment amount of at least one of a brightness of the pattern light emitted from the projection unit and an exposure amount of the image capturing unit, and to adjust, in accordance with the obtained adjustment amount, at least one of a first parameter for controlling the brightness of the pattern light emitted from the projection unit and a second parameter for controlling the exposure amount of the image capturing unit; and
    (iv) a robot configured to hold the target objects on the basis of a derivation result of the derivation unit to move the target objects.

17. A measurement apparatus comprising:
a projection unit configured to emit pattern light to target objects;
an image capturing unit configured to acquire a single captured image by capturing the target objects to which the projection unit has emitted the pattern light;
a derivation unit configured to derive, by using the single captured image, rough distances from the image capturing unit to the captured target objects included in the single captured image; and
a control unit configured to control at least one of a brightness of the pattern light emitted from the projection unit and an exposure amount of the image capturing unit in accordance with the rough distances,
wherein the derivation unit derives distances from the image capturing unit to the target objects included in a single captured image obtained by capturing, by the image capturing unit, the target objects to which the projection unit has emitted the pattern light after the control unit controls the at least one of the brightness of the pattern light emitted from the projection unit and the exposure amount of the image capturing unit.

* * * * *